United States Patent
Pollach et al.

(10) Patent No.: US 10,678,240 B2
(45) Date of Patent: Jun. 9, 2020

(54) SENSOR MODIFICATION BASED ON AN ANNOTATED ENVIRONMENTAL MODEL

(71) Applicant: Mentor Graphics Corporation, Wilsonville, OR (US)

(72) Inventors: Matthias Arnold Pollach, Munich (DE); Ljubo Mercep, Munich (DE)

(73) Assignee: Mentor Graphics Corporation, Wilsonville, OR (US)

( * ) Notice: Subject to any disclaimer, the term of this patent is extended or adjusted under 35 U.S.C. 154(b) by 23 days.

(21) Appl. No.: 15/260,149

(22) Filed: Sep. 8, 2016

(65) Prior Publication Data
US 2018/0067488 A1    Mar. 8, 2018

(51) Int. Cl.
*B60W 40/02* (2006.01)
*G05D 1/00* (2006.01)
(Continued)

(52) U.S. Cl.
CPC ............ *G05D 1/0088* (2013.01); *B60W 40/02* (2013.01); *G06K 9/00791* (2013.01); *G06N 7/005* (2013.01); *G06N 20/00* (2019.01); *H04W 4/70* (2018.02); *B60W 2510/18* (2013.01); *B60W 2510/20* (2013.01)

(58) Field of Classification Search
CPC .. G05D 1/0088; G05D 1/0276; G05D 1/0268; B60W 40/02; B60W 2510/18; B60W 2510/20; B60W 2550/10; G06N 7/005; G06N 99/005; H04W 4/005; G08G 1/16; G08G 1/166; G08G 1/167; G08G 1/0112; G08G 1/161

USPC .. 701/27, 41, 45, 49, 70, 96, 300, 301, 302, 701/408; 340/435, 465, 931
See application file for complete search history.

(56) References Cited

U.S. PATENT DOCUMENTS 5,023,617 A * 6/1991 Deering ............ B60K 31/0075
342/70
5,363,305 A    11/1994 Cox et al.
(Continued)

FOREIGN PATENT DOCUMENTS

CN        101 876 750 B     11/2015
EP         2 107 503 A1     10/2009
(Continued)

OTHER PUBLICATIONS

International Search Report and Written Opinion issued in corresponding International Application No. PCT/IB2017/055438 dated Feb. 28, 2018 (9 pp).

(Continued)

*Primary Examiner* — Richard A Goldman
(74) *Attorney, Agent, or Firm* — Mentor Graphics Corporation

(57) ABSTRACT

Systems, methods, and computer-readable storage mediums which use annotated environmental models for sensor modification are disclosed. A computing system receives an environmental model for a vehicle. The environmental model can include data from a plurality of modalities. Object annotations are received from sensors which are used to modify the environmental model, creating an annotated environmental model. A classification of a current situation is generated using the annotated environmental model, and a sensor is modified using the classification.

19 Claims, 11 Drawing Sheets

(51) Int. Cl.
*G06N 20/00* (2019.01)
*G06K 9/00* (2006.01)
*H04W 4/70* (2018.01)
*G06N 7/00* (2006.01)

(56) References Cited

U.S. PATENT DOCUMENTS

| | | | | |
|---|---|---|---|---|
| 5,832,411 A * | 11/1998 | Schatzmann | | G01N 33/0075 702/23 |
| 5,883,586 A * | 3/1999 | Tran | | G01C 23/00 340/945 |
| 6,453,223 B1 | 9/2002 | Kelly | | |
| 6,970,190 B2 * | 11/2005 | Ostromek | | H04N 5/2254 348/217.1 |
| 7,307,655 B1 * | 12/2007 | Okamoto | | G06K 9/00791 348/222.1 |
| 8,417,490 B1 * | 4/2013 | Preston | | G06F 30/15 703/2 |
| 8,620,078 B1 * | 12/2013 | Chapleau | | G06K 9/344 382/173 |
| 8,665,080 B2 * | 3/2014 | Nagamine | | B60Q 9/004 340/438 |
| 8,805,648 B2 | 8/2014 | Painsky | | |
| 8,912,978 B2 | 12/2014 | Szczerba | | |
| 9,043,072 B1 | 5/2015 | Tisdale et al. | | |
| 9,097,800 B1 | 8/2015 | Zhu | | |
| 9,201,421 B1 * | 12/2015 | Fairfield | | B60W 40/04 |
| 9,243,916 B2 | 1/2016 | Roumeliotis | | |
| 9,285,805 B1 | 3/2016 | Pollock | | |
| 9,336,436 B1 | 5/2016 | Dowdall | | |
| 9,358,924 B1 * | 6/2016 | Preston | | G06F 30/15 |
| 9,384,402 B1 | 7/2016 | Furman | | |
| 9,494,439 B1 * | 11/2016 | Ross | | B60W 50/029 |
| 9,690,293 B2 | 1/2017 | Shashua | | |
| 9,597,999 B2 * | 3/2017 | Hoffmann | | B60Q 1/085 |
| 9,612,123 B1 | 4/2017 | Levinson | | |
| 9,623,905 B2 | 4/2017 | Shashua | | |
| 9,665,100 B2 | 5/2017 | Shahuas | | |
| 9,672,446 B1 | 6/2017 | Vallespi-Gonzalez | | |
| 9,696,719 B2 | 7/2017 | Aviel | | |
| 9,709,986 B2 | 7/2017 | Gdalyahi | | |
| 9,719,801 B1 * | 8/2017 | Ferguson | | G01C 25/00 |
| 9,760,090 B2 | 9/2017 | Shashua | | |
| 9,915,947 B1 * | 3/2018 | LaForge | | G05D 1/0077 |
| 9,939,813 B2 * | 4/2018 | Shashua | | G01C 21/32 |
| 10,043,076 B1 * | 8/2018 | Zhang | | G06K 9/00671 |
| 2001/0040505 A1 * | 11/2001 | Ishida | | G01C 21/3697 340/435 |
| 2004/0039513 A1 | 2/2004 | Knoop | | B60T 7/22 701/70 |
| 2004/0064241 A1 | 4/2004 | Sekiguchi | | B60K 31/0008 701/96 |
| 2006/0293819 A1 * | 12/2006 | Harumoto | | B60W 30/18145 701/41 |
| 2007/0010933 A1 * | 1/2007 | Hochkirchen | | B60W 10/26 701/117 |
| 2007/0182623 A1 | 8/2007 | Zeng | | |
| 2008/0033645 A1 | 2/2008 | Levinson et al. | | |
| 2008/0243378 A1 | 2/2008 | Zavoli | | |
| 2008/0189003 A1 * | 8/2008 | Gillula | | G05D 1/028 701/24 |
| 2009/0228204 A1 | 9/2009 | Zavoli | | |
| 2009/0234552 A1 * | 9/2009 | Takeda | | B60W 30/16 701/96 |
| 2009/0268947 A1 * | 10/2009 | Schaufler | | G06K 9/00805 382/104 |
| 2010/0013615 A1 | 1/2010 | Herbert et al. | | |
| 2010/0094509 A1 * | 4/2010 | Luke | | B60W 40/02 701/45 |
| 2010/0191391 A1 | 7/2010 | Zeng | | |
| 2012/0310516 A1 | 12/2012 | Zeng | | |
| 2012/0311016 A1 * | 12/2012 | DeAnna | | H04L 41/046 709/202 |
| 2013/0021475 A1 * | 1/2013 | Canant | | H04N 5/33 348/144 |
| 2013/0091503 A1 | 4/2013 | Painsky | | |
| 2014/0028852 A1 * | 1/2014 | Rathi | | H04N 7/181 348/159 |
| 2014/0107888 A1 * | 4/2014 | Quast | | B60R 1/00 701/36 |
| 2014/0211044 A1 * | 7/2014 | Lee | | H04N 5/23229 348/231.99 |
| 2014/0214255 A1 * | 7/2014 | Dolgov | | G05D 1/0248 701/23 |
| 2014/0358840 A1 | 12/2014 | Tadic | | |
| 2014/0378815 A1 * | 12/2014 | Huang | | A61B 5/04009 600/409 |
| 2014/0379254 A1 | 12/2014 | Miksa | | |
| 2015/0073663 A1 * | 3/2015 | Nilsson | | B60W 30/08 701/41 |
| 2015/0210312 A1 * | 7/2015 | Stein | | G08G 1/095 701/41 |
| 2015/0268058 A1 | 9/2015 | Samarasekera | | |
| 2015/0344028 A1 * | 12/2015 | Gieseke | | B60R 1/00 701/1 |
| 2016/0033297 A1 * | 2/2016 | Konishi | | G01C 21/3685 701/31.4 |
| 2016/0039409 A1 * | 2/2016 | Hayakawa | | B60W 30/06 701/70 |
| 2016/0063703 A1 * | 3/2016 | Sasaki | | G06T 7/20 348/135 |
| 2016/0140872 A1 | 5/2016 | Palmer | | |
| 2016/0154999 A1 * | 6/2016 | Fan | | G06K 9/00201 382/103 |
| 2016/0176408 A1 * | 6/2016 | Lynch | | B60W 40/064 701/23 |
| 2016/0221503 A1 * | 8/2016 | Krokel | | G06T 5/006 |
| 2016/0223343 A1 * | 8/2016 | Averbuch | | B60W 50/14 |
| 2016/0223643 A1 | 8/2016 | Li et al. | | |
| 2016/0259332 A1 * | 9/2016 | Boshears | | A63G 7/00 |
| 2016/0357188 A1 | 12/2016 | Ansari | | |
| 2016/0368505 A1 * | 12/2016 | Sorstedt | | B60W 30/12 |
| 2017/0050566 A1 * | 2/2017 | Yamashita | | B60R 1/002 |
| 2017/0053461 A1 * | 2/2017 | Pal | | H04W 4/029 |
| 2017/0060810 A1 * | 3/2017 | Preston | | G06F 30/15 |
| 2017/0076455 A1 | 3/2017 | Newman | | |
| 2017/0080950 A1 * | 3/2017 | Pink | | G06K 9/6289 |
| 2017/0090480 A1 * | 3/2017 | Ho | | G05D 1/0214 |
| 2017/0052032 A1 | 4/2017 | Miksa | | |
| 2017/0116781 A1 * | 4/2017 | Babahajiani | | G06T 17/20 |
| 2017/0123428 A1 | 5/2017 | Levinson et al. | | |
| 2017/0124781 A1 | 5/2017 | Douillard | | |
| 2017/0132476 A1 * | 5/2017 | Chien | | G06K 9/00791 |
| 2017/0190334 A1 * | 7/2017 | Zelman | | G08G 1/096775 |
| 2017/0248953 A1 * | 8/2017 | Kelley | | B62D 15/0265 |
| 2017/0248963 A1 | 8/2017 | Levinson | | |
| 2017/0261324 A1 | 9/2017 | Roumeliotis | | |
| 2017/0270361 A1 | 9/2017 | Puttagunta | | |
| 2017/0329332 A1 | 11/2017 | Pilarski et al. | | |
| 2017/0343356 A1 | 11/2017 | Roumeliotis | | |
| 2017/0357270 A1 * | 12/2017 | Russell | | G05D 1/0242 |
| 2018/0003512 A1 | 1/2018 | Lynch | | |
| 2018/0024565 A1 | 1/2018 | Fridman | | |
| 2018/0032082 A1 | 2/2018 | Shalev-shwartz | | |
| 2018/0052860 A1 * | 2/2018 | Hayes | | H04W 4/029 |
| 2018/0067492 A1 * | 3/2018 | Oder | | G06K 9/00791 |
| 2018/0067966 A1 * | 3/2018 | Oder | | G05B 17/02 |
| 2018/0068198 A1 * | 3/2018 | Savvides | | G06K 9/3233 |
| 2018/0096457 A1 * | 4/2018 | Savvides | | G06K 9/6267 |
| 2018/0108146 A1 * | 4/2018 | Zhan | | G06K 9/4604 |
| 2018/0172454 A1 | 6/2018 | Ghadiok et al. | | |
| 2018/0202815 A1 | 7/2018 | Asai | | |
| 2018/0253630 A1 * | 9/2018 | Tamer | | G06T 11/60 |
| 2018/0314921 A1 * | 11/2018 | Mercep | | G01S 13/862 |
| 2018/0320609 A1 * | 11/2018 | McQuillen | | F01N 13/008 |
| 2018/0320645 A1 * | 11/2018 | McQuillen | | F02D 41/222 |
| 2019/0163176 A1 * | 5/2019 | Wang | | G05D 1/0027 |
| 2019/0324456 A1 * | 10/2019 | Ryan | | G05D 1/101 |
| 2019/0325241 A1 * | 10/2019 | Nunn | | G06T 7/20 |
| 2020/0008028 A1 * | 1/2020 | Yang | | H04W 4/44 |
| 2020/0019179 A1 * | 1/2020 | Schuller | | G05D 1/0055 |

(56) References Cited

U.S. PATENT DOCUMENTS

FOREIGN PATENT DOCUMENTS

| EP | 2107503 A1 | 10/2009 |
|---|---|---|
| WO | 2009/070069 A1 | 6/2009 |

OTHER PUBLICATIONS

Barzilay and Szolovits, "Exact inference in bayes nets—pseudocode." Mass. Init. Technology (retrieved at http://courses.csail.mit.edu/6.034s/handouts/spring12/bayesnets-pseudocode.pdf on Jun. 4, 2018), Feb. 2012.

T. M. Chan. "Optimal output-sensitive convex hull algorithms in two and three dimensions." Discrete and Computational Geometry, vol. 16, Issue No. 4, pp. 361-368, Jan. 1, 1996.

Hyunggi Cho, Young-Woo Seo, BVK Vijaya Kumar, and Ragunathan Raj Rajkumar. "A multi-sensor fusion system for moving object detection and tracking in urban driving environments." IEEE International Conference on Robotics and Automation (ICRA), pp. 1836-1843. IEEE, May 2014.

N. Dalal and B. Triggs. "Histograms of oriented gradients for human detection." IEEE Computer Society Conference on Computer Vision and Pattern Recognition (CVPR'05), vol. 1, pp. 886-893, Jun. 2005.

Martin Ester, Hans peter Kriegel, Jrg Sander, and Xiaowei Xu. "A density-based algorithm for discovering clusters in large spatial databases with noise." pp. 226-231. Proc. 2nd Int. Conf. Knowledge Discovery and Data Mining (KDD'96), American Association for Artificial Intelligence (AAAI) Press, Aug. 1996.

K. C. Fuerstenberg, K. C. J. Dietmayer, and V. Willhoeft. "Pedestrian recognition in urban traffic using a vehicle based multilayer laserscanner." IEEE Intelligent Vehicle Symposium, vol. 1, pp. 31-35, Jun. 2002.

Daniel Gohring, Miao Wang, Michael Schnurmacher, and Tinosch Ganjineh. "Radar/lidar sensor fusion for car-following on highways." IEEE 2011 5th International Conference on Automation, Robotics and Applications (ICARA), pp. 407-412, Dec. 2011.

John A Hartigan and Manchek A Wong. "Algorithm as 136: A k-means clustering algorithm." Journal of the Royal Statistical Society. Series C (Applied Statistics), vol. 28, issue 1, pp. 100-108, Jan. 1979.

S. C. Johnson. "Hierarchical clustering schemes." Psychometrika, vol. 32, issue 3, pp. 241-254, Sep. 1967.

N. Kaempchen, M. Buehler, and K. Dietmayer. "Feature-level fusion for freeform object tracking using laserscanner and video." Intelligent Vehicles Symposium, IEEE Proceedings, pp. 453-458, Jun. 2005.

Nico Kaempchen and Klaus Dietmayer. "Data synchronization strategies for multi-sensor fusion." Intelligent Transportation Systems, Proceedings of the IEEE Conference, pp. 1-9, Oct. 2003.

Nico Kampchen. "Feature-level fusion of laser scanner and video data for advanced driver assistance systems." University of Ulm Faculty, Engineering Sciences, Computer Science, Jun. 2007.

D. Kellner, M. Barjenbruch, K Dietmayer, J. Klappstein, and J. Dickmann. "Instantaneous lateral velocity estimation of a vehicle using doppler radar." Information Fusion, Proceedings of the 16th International Conference, pp. 877-884, Jul. 2013.

P. Kmiotek and Y. Ruichek. "Representing and tracking of dynamics objects using oriented bounding box and extended kalman filter." 11th International IEEE Conference on Intelligent Transportation Systems, pp. 322-328, Oct. 2008.

S. Lange, F. Ulbrich, and D. Goehring. "Online vehicle detection using deep neural networks and lidar based preselected image patches." IEEE Intelligent Vehicles Symposium (IV), pp. 954-959, Jun. 2016.

H. A. Loeliger, J. Dauwels, J. Hu, S. Korl, L. Ping, and F. R. Kschischang. "The factor graph approach to model-based signal processing." Proceedings of the IEEE, vol. 95, issue 6, pp. 1295-1322, Jun. 2007.

M. Mahlisch, R. Schweiger, W. Ritter, and K. Dietmayer. "Sensorfusion using spatio-temporal aligned video and lidar for improved vehicle detection." IEEE Intelligent Vehicles Symposium, pp. 424-429, Jun. 2006.

Ljubo Mercep. "Context-Centric Design of Automotive Human-Machine Interfaces." PhD thesis, Technische Universiat Munchen. Jan. 2014.

S. Roberts. "Parametric and non-parametric unsupervised cluster analysis." Pattern Recognition. vol. 30, pp. 261-272. Apr. 1996.

J. Sankaran and N. Zoran. Tda2x, a soc optimized for advanced driver assistance systems. Speech and Signal Processing (ICASSP), IEEE International Conference on Acoustics, pp. 2204-2208, May 2014.

R. Schubert, C. Adam, M. Obst, N. Mattern, V. Leonhardt, and G. Wanielik. "Empirical evaluation of vehicular models for ego motion estimation." 2011 IEEE Intelligent Vehicles Symposium (IV), pp. 534-539, Jun. 2011.

Neil Scicluna and Christos-Savvas Bouganis. "ARC 2014: A Multidimensional FPGA-Based Parallel DBSCAN Architecture." ACM Transactions on Reconfigurable Technology and Systems. vol. 9, issue 1, pp. 1-12, Nov. 2015.

Qi Yue Shaobo Shi and Qin Wang. "Fpga based accelerator for parallel dbscan algorithm." Computer Modelling & New Technologies. vol. 18, issue 2, pp. 135-142, Jan. 2014.

Z. Taylor and J. Nieto. "Motion-based calibration of multimodal sensor extrinsics and timing o_set estimation." IEEE Transactions on Robotics. vol. 32, issue 5, pp. 1215-1229, Oct. 2016.

Rui Xu and D. Wunsch, II. "Survey of clustering algorithms." Trans. Neur. Netw. vol. 16, issue 3, pp. 645-678, May 2005.

Christopher M. Bishop. "Pattern Recognition and Machine Learning (Information Science and Statistics)." Springer-Verlag New York, Inc., Secaucus, NJ,USA, pp. 423-435, pp. 423-435, Aug. 2006.

Judea Pearl. "Probabilistic Reasoning in Intelligent Systems: Networks of Plausible Inference." Morgan Kaufmann Publishers Inc., San Francisco, CA, USA, p. 116-123, Sep. 1988.

David L. Hall and Sonya A. H. McMullen. "Mathematical techniques in multisensor data fusion." Artech House Information Warfare Library. p. 1-4, Feb. 2004.

Fredrik Sandblom et al, "Sensor Data Fusion for Multiple Configurations", 2014Ieee Intelligent Vehicles Syposium Proceedings, Jun. 8, 2014, pp. 1325-1331.

N. Floudas et al: "Multi-Sensor Coordination and Fusion for Automotive Safety Applications", 20069th International Conference on Information Fusion, Fusion 2006 Inst. of Elec. and Elec. Eng. Computer Society US, IEEE, Piscataway, NJ, USA, Jul. 31, 2006, pp. 1-8.

C. Coue et al: "Using Bayesian Programming for Multi-sensor Multi-target Tracking in Automotive Applications"; Proceedings / 2003 IEEE International Conference on Robotics and Automation : Sep. 14-19, 2003. The Grand Hotel. Taipei, Taiwan; [Proceedings of the IEEE International Conference on Robotics and Automation], IEEE Service Center. Piscataway, Nj. ; vol. 2, pp. 2104-2109.

Weiss K et al: "Target modeling and dynamic classification for adaptive sensor data fusion"; Proc. IEEE Intelligent Vehicle Symposium 2003 ; Jun. 9, 2003 (Jun. 9, 2003), pp. 132-137.

* cited by examiner

SENSOR MODIFICATION BASED ON AN ANNOTATED ENVIRONMENTAL MODEL

TECHNICAL FIELD

This disclosure is generally related to automated driving and assistance systems and, more specifically, to determining situational awareness in automated driving and assistance systems.

BACKGROUND

Many modern vehicles include advanced driver assistance systems (ADAS) to provide automated safety and/or assisted driving functionality. Many next generation vehicles will likely include autonomous driving (AD) systems to control and navigate the vehicles independent of human interaction. Certain ADAS and AD systems perform driving operations based on a situational awareness of the vehicle's surroundings and the state of the vehicle. The situational awareness of the vehicle can include a classification, such as a situational annotation, of the current driving situation in which the vehicle is operating. Machine learning techniques are one of the possibilities used to classify a situation and generate a situational annotation. In existing systems, a situation is classified based on data from a single source of data (such as a single sensor modality) and/or object-level data from multiple sensors. Classifying a situation using these and other existing approaches, however, can be computationally inefficient and inaccurate.

SUMMARY

Determining a situational annotation of a vehicle based on an annotated environmental model is disclosed. A computing system receives an annotated environmental model for a vehicle. The annotated environmental model can include data from a plurality of modalities. The computing system uses a classifier to determine an annotation of the vehicle situation based, at least in part, on the annotated environmental model. The computing system provides the situational annotation to a driving functionality system. The driving functionality system is configured to use the situational annotation to generate signals to control operation the vehicle.

DETAILED DESCRIPTION

Sensor Fusion for Autonomous Driving

Figure 1:
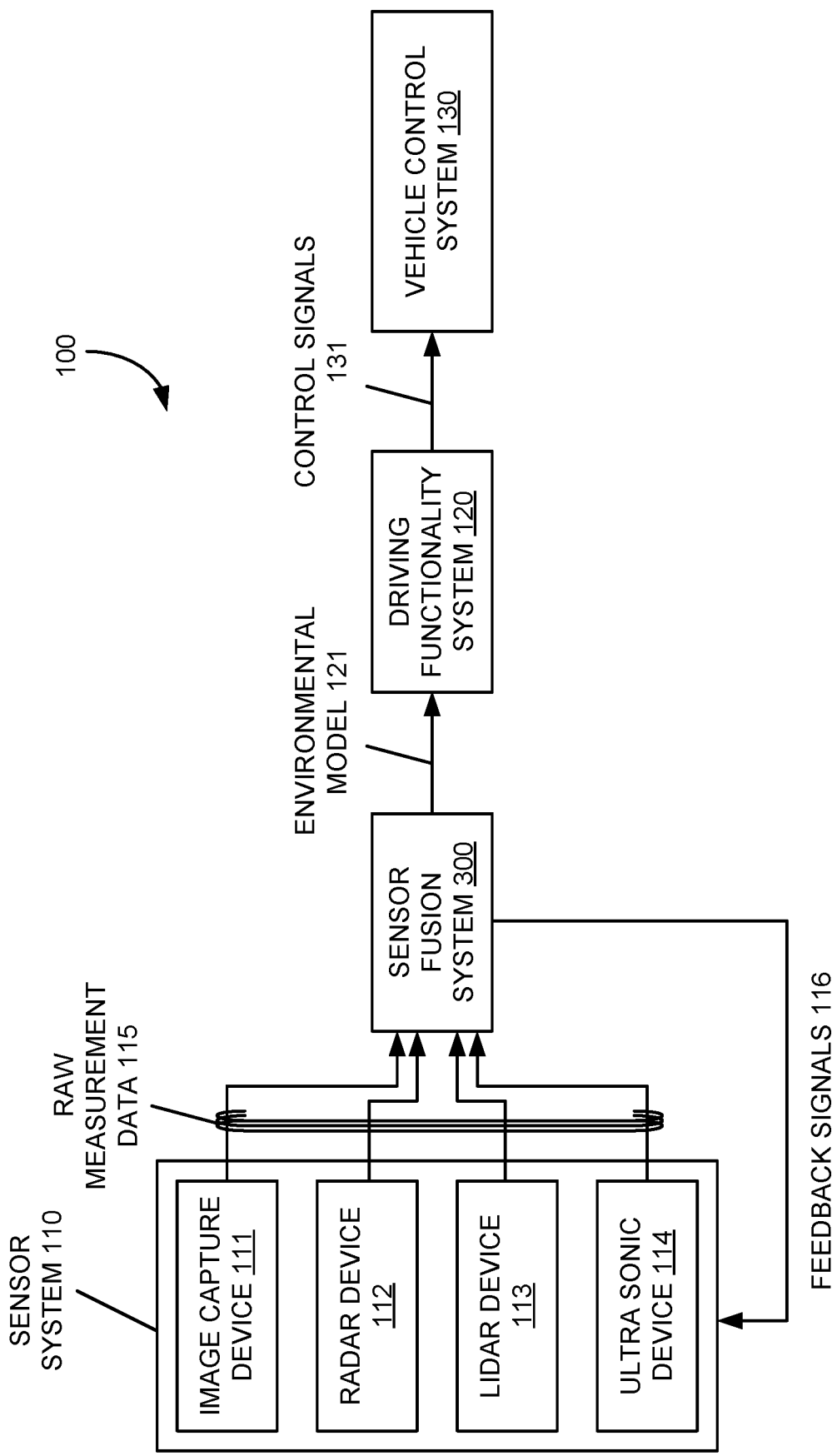
FIG. 1 illustrates an example autonomous driving system according to various embodiments.

FIG. 1 illustrates an example autonomous driving system 100 according to various embodiments. Referring to FIG. 1, the autonomous driving system 100, when installed in a vehicle, can sense an environment surrounding the vehicle and control operation of the vehicle based, at least in part, on the sensed environment. The autonomous driving system 100 can classify its surroundings to determine a situational annotation, classification, and/or awareness of the vehicle and its surroundings. The situational annotation can be used to evaluate driving situations and allow various advanced driver assistance systems (ADAS) and autonomous driving (AD) systems to perform situation aware driving operations.

The autonomous driving system 100 can include a sensor system 110 having multiple sensors, each of which can measure different portions of the environment surrounding the vehicle and output the measurements as raw measurement data 115. The raw measurement data 115 can include characteristics of light, electromagnetic waves, or sound captured by the sensors, such as an intensity or a frequency of the light, electromagnetic waves, or the sound, an angle of reception by the sensors, a time delay between a transmission and the corresponding reception of the light, electromagnetic waves, or the sound, a time of capture of the light, electromagnetic waves, or sound, or the like.

The sensor system 110 can include multiple different types of sensors, such as image capture devices 111, Radio Detection and Ranging (Radar) devices 112, Light Detection and Ranging (Lidar) devices 113, ultra-sonic devices 114, microphones, infrared or night-vision cameras, time-of-flight cameras, cameras capable of detecting and transmitting differences in pixel intensity, or the like. An image capture device 111, such as one or more cameras, can capture at least one image of at least a portion of the environment surrounding the vehicle. The image capture device 111 can output the captured image(s) as raw measurement data 115, which, in some embodiments, can be unprocessed and/or uncompressed pixel data corresponding to the captured image(s).

A radar device 112 can emit radio signals into the environment surrounding the vehicle. Since the emitted radio signals may reflect off of objects in the environment, the radar device 112 can detect the reflected radio signals incoming from the environment. The radar device 112 can measure the incoming radio signals by, for example, measuring a signal strength of the radio signals, a reception angle, a frequency, or the like. The radar device 112 also can measure a time delay between an emission of a radio signal and a measurement of the incoming radio signals from the environment that corresponds to emitted radio signals reflected off of objects in the environment. The radar device 112 can output the measurements of the incoming radio signals as the raw measurement data 115.

A lidar device 113 can transmit light, such as from a laser or other optical transmission device, into the environment surrounding the vehicle. The transmitted light, in some embodiments, can be pulses of ultraviolet light, visible light, near infrared light, or the like. Since the transmitted light can reflect off of objects in the environment, the lidar device 113 can include a photo detector to measure light incoming from the environment. The lidar device 113 can measure the incoming light by, for example, measuring an intensity of the light, a wavelength, or the like. The lidar device 113 also can measure a time delay between a transmission of a light pulse and a measurement of the light incoming from the environment that corresponds to transmitted light having reflected off of objects in the environment. The lidar device 113 can output the measurements of the incoming light and the time delay as the raw measurement data 115.

An ultrasonic device 114 can emit acoustic pulses, for example, generated by transducers or the like, into the environment surrounding the vehicle. The ultra-sonic device 114 can detect ultra-sonic sound incoming from the environment, such as for example, the emitted acoustic pulses having been reflected off of objects in the environment. The ultra-sonic device 114 also can measure a time delay between emission of the acoustic pulses and reception of the ultra-sonic sound from the environment that corresponds to the emitted acoustic pulses having reflected off of objects in the environment. The ultra-sonic device 114 can output the measurements of the incoming ultra-sonic sound and the time delay as the raw measurement data 115.

Figure 2A:
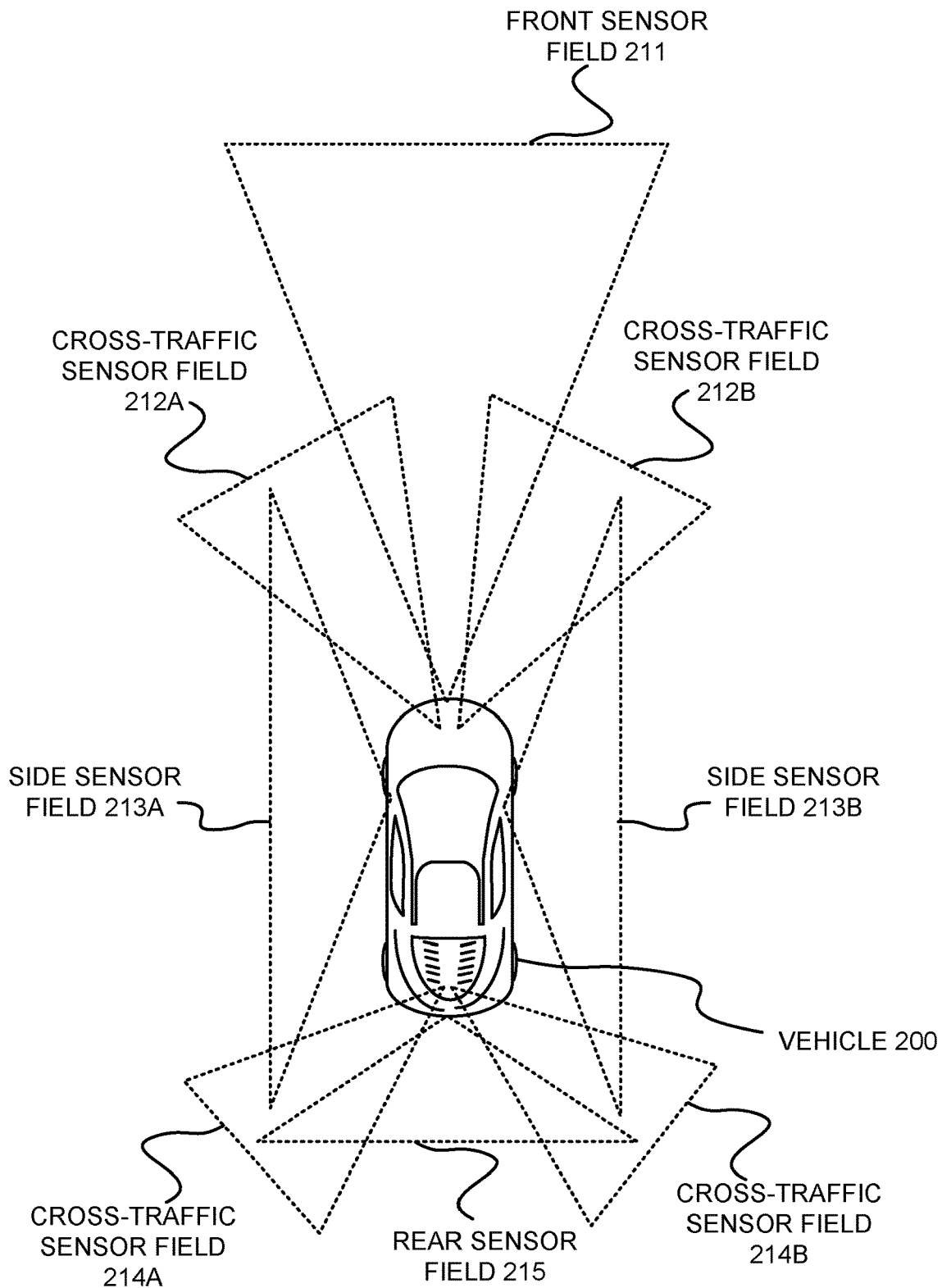
FIG. 2A illustrates example measurement coordinate fields for a sensor system deployed in a vehicle according to various embodiments.

The different sensors in the sensor system 110 can be mounted in the vehicle to capture measurements for different portions of the environment surrounding the vehicle. FIG. 2A illustrates an example measurement coordinate fields for a sensor system deployed in a vehicle 200 according to various embodiments. Referring to FIG. 2A, the vehicle 200 can include multiple different sensors capable of detecting incoming signals, such as light signals, electromagnetic signals, and sound signals. Each of these different sensors can have a different field of view into an environment around the vehicle 200. These fields of view can allow the sensors to measure light and/or sound in different measurement coordinate fields.

The vehicle in this example includes several different measurement coordinate fields, including a front sensor field 211, multiple cross-traffic sensor fields 212A, 212B, 214A, and 214B, a pair of side sensor fields 213A and 213B, and a rear sensor field 215. Each of the measurement coordinate fields can be sensor-centric, meaning that the measurement coordinate fields can describe a coordinate region relative to a location of its corresponding sensor.

Referring back to FIG. 1, the autonomous driving system 100 can include a sensor fusion system 300 to receive the raw measurement data 115 from the sensor system 110 and populate an environmental model 121 associated with the vehicle with the raw measurement data 115. In some embodiments, the environmental model 121 can have an environmental coordinate field corresponding to a physical envelope surrounding the vehicle, and the sensor fusion system 300 can populate the environmental model 121 with the raw measurement data 115 based on the environmental coordinate field. In some embodiments, the environmental coordinate field can be a non-vehicle centric coordinate field, for example, a world coordinate system, a path-centric coordinate field, or the like.

Figure 2B:
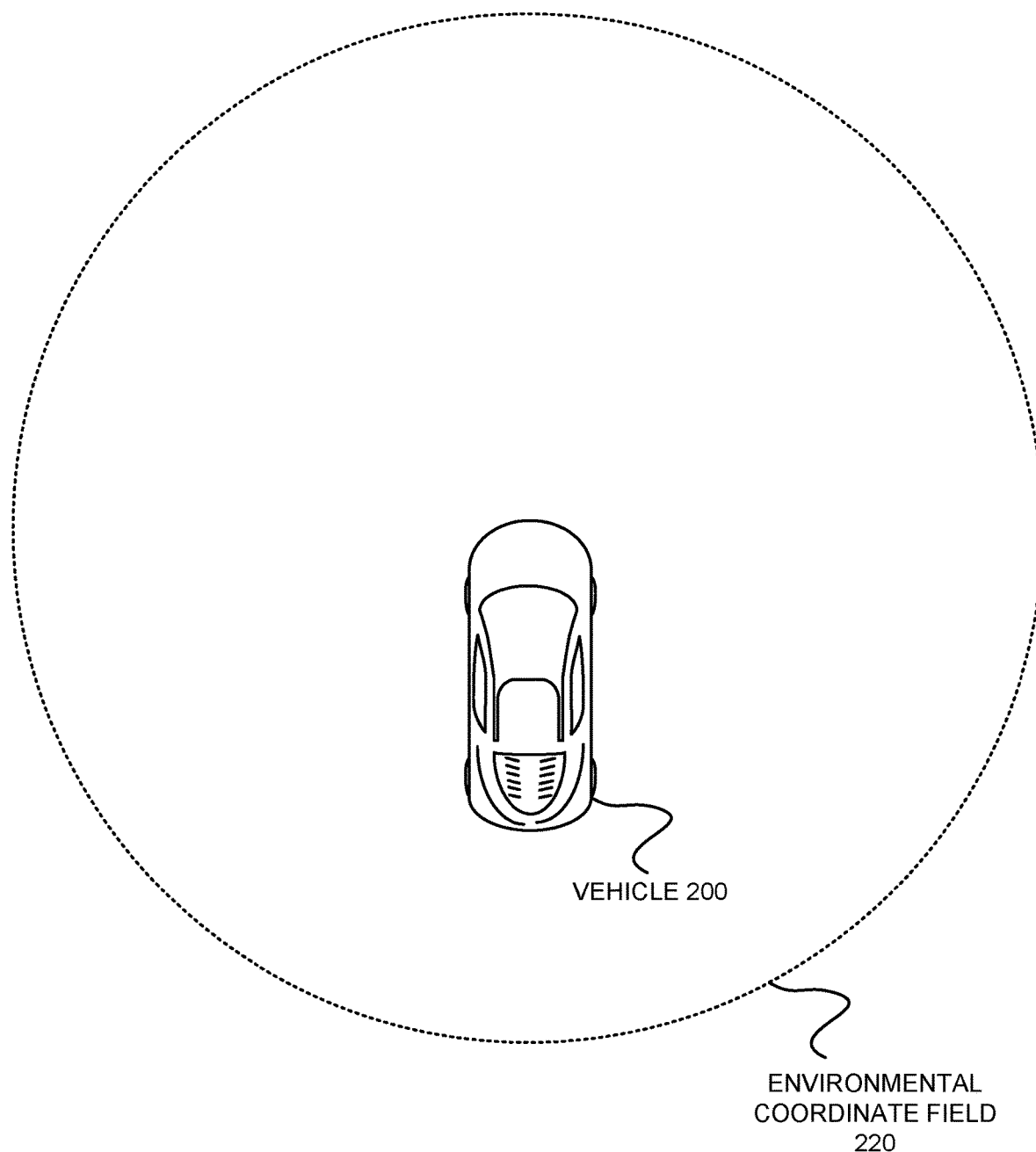
FIG. 2B illustrates an example environmental coordinate field associated with an environmental model for a vehicle according to various embodiments.

FIG. 2B illustrates an example environmental coordinate field 220 associated with an environmental model for the vehicle 200 according to various embodiments. Referring to FIG. 2B, an environment surrounding the vehicle 200 can correspond to the environmental coordinate field 220 for the environmental model. The environmental coordinate field 220 can be vehicle-centric and provide a 360 degree area around the vehicle 200. The environmental model can be populated and annotated with information detected by the sensor fusion system 300 or inputted from external sources. Embodiments will be described below in greater detail.

Referring back to FIG. 1, to populate the raw measurement data 115 into the environmental model 121 associated with the vehicle, the sensor fusion system 300 can spatially align the raw measurement data 115 to the environmental coordinate field of the environmental model 121. The sensor fusion system 300 also can identify when the sensors captured the raw measurement data 115, for example, by time stamping the raw measurement data 115 when received from the sensor system 110. The sensor fusion system 300 can populate the environmental model 121 with the time stamp or other time-of-capture information, which can be utilized to temporally align the raw measurement data 115 in the environmental model 121. In some embodiments, the sensor fusion system 300 can analyze the raw measurement data 115 from the multiple sensors as populated in the environmental model 121 to detect a sensor event or at least one object in the environmental coordinate field associated with the vehicle. The sensor event can include a sensor measurement event corresponding to a presence of the raw measurement data 115 in the environmental model 121, for example, above a noise threshold. The sensor event can include a sensor detection event corresponding to a spatial and/or temporal grouping of the raw measurement data 115 in the environmental model 121. The object can correspond to spatial grouping of the raw measurement data 115 having been tracked in the environmental model 121 over a period of time, allowing the sensor fusion system 300 to determine the raw measurement data 115 corresponds to an object around the vehicle. The sensor fusion system 300 can populate the environment model 121 with an indication of the detected sensor event or detected object and a confidence level of the detection. Embodiments of sensor fusion and sensor event detection or object detection will be described below in greater detail.

The sensor fusion system 300, in some embodiments, can generate feedback signals 116 to provide to the sensor system 110. The feedback signals 116 can be configured to prompt the sensor system 110 to calibrate one or more of its sensors. For example, the sensor system 110, in response to the feedback signals 116, can re-position at least one of its sensors, expand a field of view of at least one of its sensors, change a refresh rate or exposure time of at least one of its sensors, alter a mode of operation of at least one of its sensors, or the like.

The autonomous driving system 100 can include a driving functionality system 120 to receive at least a portion of the environmental model 121 from the sensor fusion system 300. The driving functionality system 120 can analyze the data included in the environmental model 121 to implement automated driving functionality or automated safety and assisted driving functionality for the vehicle. The driving functionality system 120 can generate control signals 131 based on the analysis of the environmental model 121. In some embodiments, the driving functionality system 120 can include a situational awareness system as described herein. The situational awareness system can also be a component of the sensor fusion system 300 (as discussed below).

The situational awareness system can analyze portions of the environmental model 121 to determine a situational annotation of the vehicle. The situational awareness system may include a classifier, such as a neural network or other machine learning module. The situational annotation of the vehicle can include a classification of the vehicle surroundings (e.g., locations of other cars, landmarks, pedestrian, stoplights, intersections, highway exits, weather, visibility, etc.), the state of the vehicle (e.g., speed, acceleration, path of the vehicle, etc.), and/or any other data describing the situation in which the vehicle is driving or will be driving in the near future. The situational annotation can be output to various driving functionality systems, which can use the situational annotation to generate control signals 131. In one example, a forward braking assistant can use a situational annotation to decide whether to apply full braking, implement a swerving maneuver, or take another action. The vehicle may encounter a stopped truck, and a forward braking assistant can use a situational annotation to determine appropriate actions to avoid the stopped truck. The situational annotation can include, for example, information relevant to the forward braking assistant such as traffic in surrounding the lanes, unknown obstacles directly in front of the vehicle, known objects in front of the vehicle, an indication that there is a car directly behind the vehicle, and/or other information. Based on the situational annotation, the forward braking assistant can make a situation-aware decision to swerve around the stopped vehicle, rather than attempting to stop. In another example, a human machine interface (HMI) can use the situational annotation to determine outputs to vehicle occupants, such as a warning signal when the situational annotation indicates a dangerous situation.

The autonomous driving system 100 can include a vehicle control system 130 to receive the control signals 131 from the driving functionality system 120. The vehicle control system 130 can include mechanisms to control operation of the vehicle, for example by controlling different functions of the vehicle, such as braking, acceleration, steering, parking brake, transmission, user interfaces, warning systems, or the like, in response to the control signals.

Figure 3:
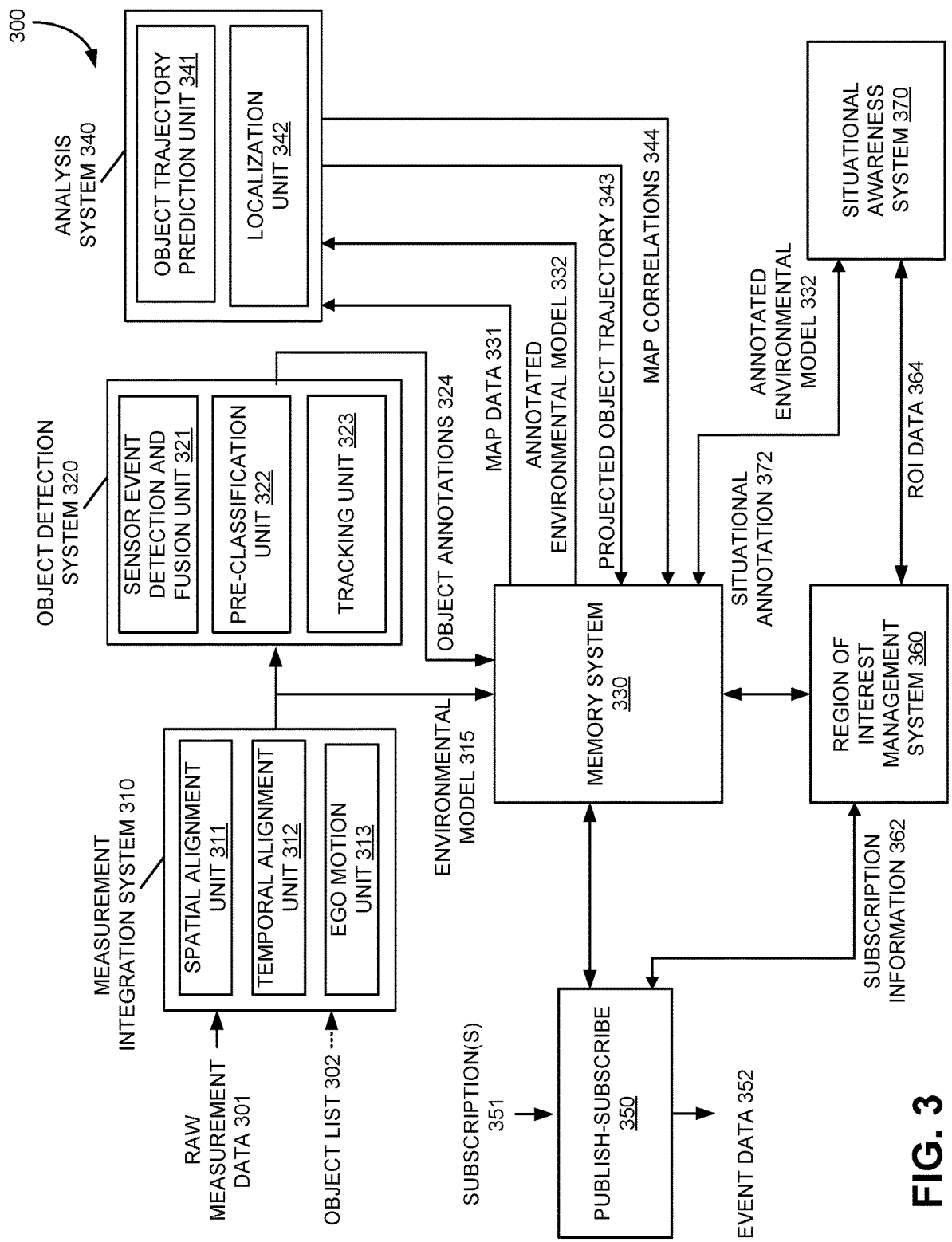
FIG. 3 illustrates an example sensor fusion system according to various examples.

FIG. 3 illustrates an example sensor fusion system 300 according to various examples. Referring to FIG. 3, the sensor fusion system 300 can include a measurement integration system 310 to receive raw measurement data 301 from multiple sensors mounted in a vehicle. The measurement integration system 310 can generate an environmental model 315 for the vehicle, which can be populated with the raw measurement data 301.

The measurement integration system 310 can include a spatial alignment unit 311 to correlate measurement coordinate fields of the sensors to an environmental coordinate field for the environmental model 315. The measurement integration system 310 can utilize this correlation to convert or translate locations for the raw measurement data 301 within the measurement coordinate fields into locations within the environmental coordinate field. The measurement integration system 310 can populate the environmental model 315 with the raw measurement data 301 based on the correlation between the measurement coordinate fields of the sensors to the environmental coordinate field for the environmental model 315.

The measurement integration system 310 also can temporally align the raw measurement data 301 from different sensors in the sensor system. In some embodiments, the measurement integration system 310 can include a temporal alignment unit 312 to assign time stamps to the raw measurement data 301 based on when the sensor captured the raw measurement data 301, when the raw measurement data 301 was received by the measurement integration system 310, or the like. In some embodiments, the temporal alignment unit 312 can convert a capture time of the raw measurement data 301 provided by the sensors into a time corresponding to the sensor fusion system 300. The measurement integration system 310 can annotate the raw measurement data 301 populated in the environmental model 315 with the time stamps for the raw measurement data 301. The time stamps for the raw measurement data 301 can be utilized by the sensor fusion system 300 to group the raw measurement data 301 in the environmental model 315 into different time periods or time slices. In some embodiments, a size or duration of the time periods or time slices can be based, at least in part, on a refresh rate of one or more sensors in the sensor system. For example, the sensor fusion system 300 can set a time slice to correspond to the sensor with a fastest rate of providing new raw measurement data 301 to the sensor fusion system 300.

The measurement integration system 310 can include an ego motion unit 313 to compensate for movement of at least one sensor capturing the raw measurement data 301, for example, due to the vehicle driving or moving in the environment. The ego motion unit 313 can estimate motion of the sensor capturing the raw measurement data 301, for example, by utilizing tracking functionality to analyze vehicle motion information, such as global positioning system (GPS) data, inertial measurements, vehicle odometer data, video images, or the like. The tracking functionality can implement a Kalman filter, a Particle filter, optical flow-based estimator, or the like, to track motion of the vehicle and its corresponding sensors relative to the environment surrounding the vehicle.

The ego motion unit 313 can utilize the estimated motion of the sensor to modify the correlation between the measurement coordinate field of the sensor to the environmental coordinate field for the environmental model 315. This compensation of the correlation can allow the measurement integration system 310 to populate the environmental model 315 with the raw measurement data 301 at locations of the environmental coordinate field where the raw measurement data 301 was captured as opposed to the current location of the sensor at the end of its measurement capture.

In some embodiments, the measurement integration system 310 may receive objects or object lists 302 from a variety of sources. The measurement integration system 310 can receive the object list 302 from sources external to the vehicle, such as in a vehicle-to-vehicle (V2V) communication, a vehicle-to-infrastructure (V2I) communication, a vehicle-to-pedestrian (V2P) communication, a vehicle-to-device (V2D) communication, a vehicle-to-grid (V2G) communication, or generally a vehicle-to-everything (V2X) communication. The measurement integration system 310 also can receive the objects or an object list 302 from other systems internal to the vehicle, such as from a human machine interface, mapping systems, localization system, driving functionality system, vehicle control system, or the vehicle may be equipped with at least one sensor that outputs the object list 302 rather than the raw measurement data 301.

The measurement integration system 310 can receive the object list 302 and populate one or more objects from the object list 302 into the environmental model 315 along with the raw measurement data 301. The object list 302 may include one or more objects, a time stamp for each object, and optionally include a spatial metadata associated with a location of objects in the object list 302. For example, the object list 302 can include speed measurements for the vehicle, which may not include a spatial component to be stored in the object list 302 as the spatial metadata. When the object list 302 includes a confidence level associated with an object in the object list 302, the measurement integration system 310 also can annotate the environmental model 315 with the confidence level for the object from the object list 302.

The sensor fusion system 300 can include an object detection system 320 to receive the environmental model 315 from the measurement integration system 310. In some embodiments, the sensor fusion system 300 can include a memory system 330 to store the environmental model 315 from the measurement integration system 310. The object detection system 320 may access the environmental model 315 from the memory system 330.

The object detection system 320 can analyze data stored in the environmental model 315 to detect a sensor detection event or at least one object. The sensor fusion system 300 can populate the environment model 315 with an indication of the sensor detection event or detected object at a location in the environmental coordinate field corresponding to the detection. The sensor fusion system 300 also can identify a confidence level associated with the detection, which can be based on at least one of a quantity, a quality, or a sensor diversity of raw measurement data 301 utilized in detecting the sensor detection event or detected object. The sensor fusion system 300 can populate the environment model 315 with the confidence level associated with the detection. For example, the object detection system 320 can annotate the environmental model 315 with object annotations 324, which populates the environmental model 315 with the detected sensor detection event or detected object and corresponding confidence level of the detection.

The object detection system 320 can include a sensor event detection and fusion unit 321 to monitor the environmental model 315 to detect sensor measurement events. The sensor measurement events can identify locations in the environmental model 315 having been populated with the raw measurement data 301 for a sensor, for example, above a threshold corresponding to noise in the environment. In some embodiments, the sensor event detection and fusion unit 321 can detect the sensor measurement events by identifying changes in intensity within the raw measurement data 301 over time, changes in reflections within the raw measurement data 301 over time, change in pixel values, or the like.

The sensor event detection and fusion unit 321 can analyze the raw measurement data 301 in the environmental model 315 at the locations associated with the sensor measurement events to detect one or more sensor detection events. In some embodiments, the sensor event detection and fusion unit 321 can identify a sensor detection event when the raw measurement data 301 associated with a single sensor meets or exceeds sensor event detection threshold. For example, the sensor event detection and fusion unit 321 can analyze an image captured by a camera in the raw measurement data 301 to identify edges in the image, shapes in the image, or the like, which the sensor event detection and fusion unit 321 can utilize to identify a sensor detection event for the image. The sensor event detection and fusion unit 321 also may analyze groups of intensity points in raw measurement data 301 corresponding to a lidar sensor or groups reflections in raw measurement data 301 corresponding to a radar sensor to determine the a sensor detection event for raw measurement data 301 for those sensors.

The sensor event detection and fusion unit 321, in some embodiments, can combine the identified sensor detection event for a single sensor with raw measurement data 301 associated with one or more sensor measurement events or sensor detection events captured by at least another sensor to generate a fused sensor detection event. The fused sensor detection event can correspond to raw measurement data 301 from multiple sensors, at least one of which corresponds to the sensor detection event identified by the sensor event detection and fusion unit 321.

The object detection system 320 can include a pre-classification unit 322 to assign a pre-classification to the sensor detection event or the fused sensor detection event. In some embodiments, the pre-classification can correspond to a type of object, such as another vehicle, a pedestrian, a cyclist, an animal, a static object, or the like. The pre-classification unit 322 can annotate the environmental model 315 with the sensor detection event, the fused sensor detection event and/or the assigned pre-classification.

The object detection system 320 also can include a tracking unit 323 to track the sensor detection events or the fused sensor detection events in the environmental model 315 over time, for example, by analyzing the annotations in the environmental model 315, and determine whether the sensor detection event or the fused sensor detection event corresponds to an object in the environmental coordinate system. In some embodiments, the tracking unit 323 can track the sensor detection event or the fused sensor detection event utilizing at least one state change prediction model, such as a kinetic model, a probabilistic model, or other state change prediction model. The tracking unit 323 can select the state change prediction model to utilize to track the sensor detection event or the fused sensor detection event based on the assigned pre-classification of the sensor detection event or the fused sensor detection event by the pre-classification unit 322. The state change prediction model may allow the tracking unit 323 to implement a state transition prediction, which can assume or predict future states of the sensor detection event or the fused sensor detection event, for example, based on a location of the sensor detection event or the fused sensor detection event in the environmental model 315, a prior movement of the sensor detection event or the fused sensor detection event, a classification of the sensor detection event or the fused sensor detection event, or the like. In some embodiments, the tracking unit 323 implementing the kinetic model can utilize kinetic equations for velocity, acceleration, momentum, or the like, to assume or predict the future states of the sensor detection event or the fused sensor detection event based, at least in part, on its prior states. The tracking unit 323 may determine a difference between the predicted future state of the sensor detection event or the fused sensor detection event and its actual future state, which the tracking unit 323 may utilize to determine whether the sensor detection event or the fused sensor detection event is an object. After the sensor detection event or the fused sensor detection event has been identified by the pre-classification unit 322, the tracking unit 323 can track the sensor detection event or the fused sensor detection event in the environmental coordinate field associated with the environmental model 315, for example, across multiple different sensors and their corresponding measurement coordinate fields.

When the tracking unit 323, based on the tracking of the sensor detection event or the fused sensor detection event with the state change prediction model, determines the sensor detection event or the fused sensor detection event is an object, the object tracking unit 323 can annotate the environmental model 315 to indicate the presence of the object. The tracking unit 323 can continue tracking the detected object over time by implementing the state change prediction model for the object and analyzing the environmental model 315 when updated with additional raw measurement data 301. After the object has been detected, the tracking unit 323 can track the object in the environmental coordinate field associated with the environmental model 315, for example, across multiple different sensors and their corresponding measurement coordinate fields.

The sensor fusion system 300 can include an analysis system 340 to develop information from the annotated environmental model 332 for utilization by a driving functionality system which is providing input to a vehicle control system. The analysis system 340 can include an object trajectory prediction unit 341 to generate a projected object trajectory 343 of a tracked object proximate to the vehicle. The object trajectory prediction unit 341 can access the annotated environmental model 332 from the memory system 330 or receive them directly from the measurement integration system 310 and/or the object detection system 320. The object trajectory prediction unit 341 can utilize the annotated environmental model 332 along with the state change prediction model corresponding to the tracked object to predict movement of the tracked object relative to the vehicle in the future. Since a tracked object may have a multitude of options for moving in the future, in some embodiments, the object trajectory prediction unit 341 can generate a range of expected trajectories along with probabilities associated with the expected trajectories in the range. The object trajectory prediction unit 341 can annotate the environmental model 315 with the projected object trajectory 343, for example, by storing the projected object trajectory 343 in the annotated environmental model 332 residing the in memory system 330.

The analysis system 340 can include a localization system 342 to utilize the annotated environmental model 332 to determine a location of the vehicle. The localization system 342 can receive the global positioning system (GPS) information and map data 331, for example, from the memory system 330. The map data 331 can include topographical maps, terrain maps, street view maps, or the like, of an area corresponding to a location of the vehicle. The map data 331 can include features, such as roadways, signs, traffic signals, transit crossings, pedestrian crossings, buildings, trees, structures, terrain gradients, topographical edges, photogrammetry, intensity gradients, or like.

The localization system 342 can correlate data or annotations in the annotated environmental model 332 to landmarks or objects in the map data 331. In some embodiments, the localization system 342 can access the annotated environmental model 332 from the memory system 330 or receive them directly from the measurement integration system 310 and/or the object detection system 320. The correlation between the map data 331 and the annotated environmental model 332 can identify a vehicle location 344 describing a position of the vehicle relative to the map data 331. The localization system 342 also can utilize the annotated environmental model 332 to determine in-lane localization for the vehicle. The in-lane localization can identify the vehicle location 344 describing the position of the vehicle relative to a lane in a roadway. The localization system 342 can selectively perform in-lane localization and map data correlation with the annotated environmental model 332 to identify the vehicle location 344, for example, based on a driving situation, processing resource utilization, or the like. The localization system 342 can output the vehicle location 344, which, in some embodiments, can be stored by the memory system 330 as another annotation to the annotated environmental model 332.

The sensor fusion system 300 can include a publish-subscribe system 350 to communicate with devices, components, or applications external to the sensor fusion system 300. In some embodiments, the publish-subscribe system 350 can allow processes or applications in a driving functionality system to receive information from the annotated environmental model 332 or to provide annotations to the annotated environmental model 332.

The publish-subscribe system 350 can receive subscriptions 351, for example, from a driving functionality system, a vehicle control system, or other devices external from the sensor fusion system 300. The subscriptions 351 may identify at least one region of interest in the annotated environmental model 315 for a region of interest management system 360 to monitor for data or events. The region of interest can have a spatial description, for example, a portion of the environmental coordinate field in the annotated environmental model 332. The region of interest can have a temporal description, for example, as time window or a time offset during which the region of interest management system 360 can monitor the annotated environmental model 332. In some embodiments, the subscriptions 351 can include additional monitoring information, such as a type of data to monitor, a type of detection, and whether to enable dynamic adaptation of the identified region of interest.

The publish-subscribe system 350 can provide at least a portion of the subscriptions 351 to the region of interest management system 360 as subscription information 362. The region of interest management system 360 can analyze the subscription information 362 to identify at least one region of interest of the annotated environmental model 332 to monitor for data or events. In some embodiments, the region of interest management system 360 can include a registry of the one or more regions of interest that the region of interest management system 360 monitors based on the subscription information 362 from the publish-subscribe system 350.

The region of interest management system 360 can monitor the environmental model 332, for example, by accessing the memory system 330, to identify data and events corresponding to at least one of the regions of interest in the registry. When the region of interest management system 360 detects data or an event corresponding to a region of interest in a subscription 362, the region of interest management system 360 can forward detection information to the publish-subscribe system 350. The detection information can identify the region of interest associated with the detection, the detected portion of the annotated environmental model 332 or a reference to the detected portion of the annotated environmental model 332 in the memory system 330, a type of detection or the like. The publish-subscribe system 350 can utilize the detection information to generate and output event data 352 to the devices, systems, applications, or components that provided the publish-subscribe system 350 the subscription 351 describing the region of interest associated with the detection.

The region of interest management system 360 also can dynamically adapt the region of interest for one or more of the subscriptions 351, for example, based on the mode of operation of the vehicle, a planned path or route the vehicle expects to traverse, features in map data 331, or the like. For example, the region of interest management system 360 or other portion of the sensor fusion system 300 can identify locations of upcoming traffic lights or signage and suggest the process or component in the driving functionality system expand its region of interest or add a new region of interest to include the upcoming traffic lights or signage. In another example, the region of interest management system 360 or other portion of the system 300 can identify the vehicle plans to make a turn and expand its region of interest to include areas corresponding to the road after making the turn.

The sensor fusion system 300 can include and/or interface with a situational awareness system 370. The situational awareness system 370 can be a component of the sensor fusion system 300. Alternatively as discussed above, the situational awareness system 370 can be a component of the driving functionality system 120 of FIG. 1. The situation awareness system 370 can include a classifier that determines a situational annotation 372 based on input from various systems. In certain cases, the situational awareness system 370 receives the annotated environmental model 332 from the memory system 330, projected object trajectory data 343 from the object trajectory prediction unit 341, map correlations from the localization unit 342, region of interest data 364 from the region of interest management system 360, and/or other situational context data. The situational awareness system 370 uses the various input data (that is, situational context data) to classify the current situation of the vehicle. The classification result is represented by a situational annotation 372. The situational annotation 372 of the vehicle can include and/or represent an awareness of the vehicle surroundings, the state of the vehicle, and/or any other data describing the situation in which the vehicle is driving or will be driving in the future. A situational annotation 372 or parts of the situational annotation 372 may be output to various systems, units, or devices that subscribe to the situational awareness system 370.

In some embodiments, the publish-subscribe system 350 can receive subscriptions 351, for example, from a driving functionality system, a vehicle control system, or other devices to the situational awareness system 370. For example, a driving functionality system can subscribe to the situation awareness system 370 via the publish-subscribe system 350. Subscription information 362 describing the parameters of the subscription can be passed to the situational awareness system 370 (e.g., via the region of interest management system 360). When the situational awareness system 370 generates a situational annotation 372, the situational annotation 372 can be provided to the memory system 330. The memory system 330 can cache the situational annotation 372 for distribution to driving functionality systems that have subscribed to the situational awareness system 370 via, for example, the publish-subscribe system 350.

Situational Awareness Determination

Figure 4:
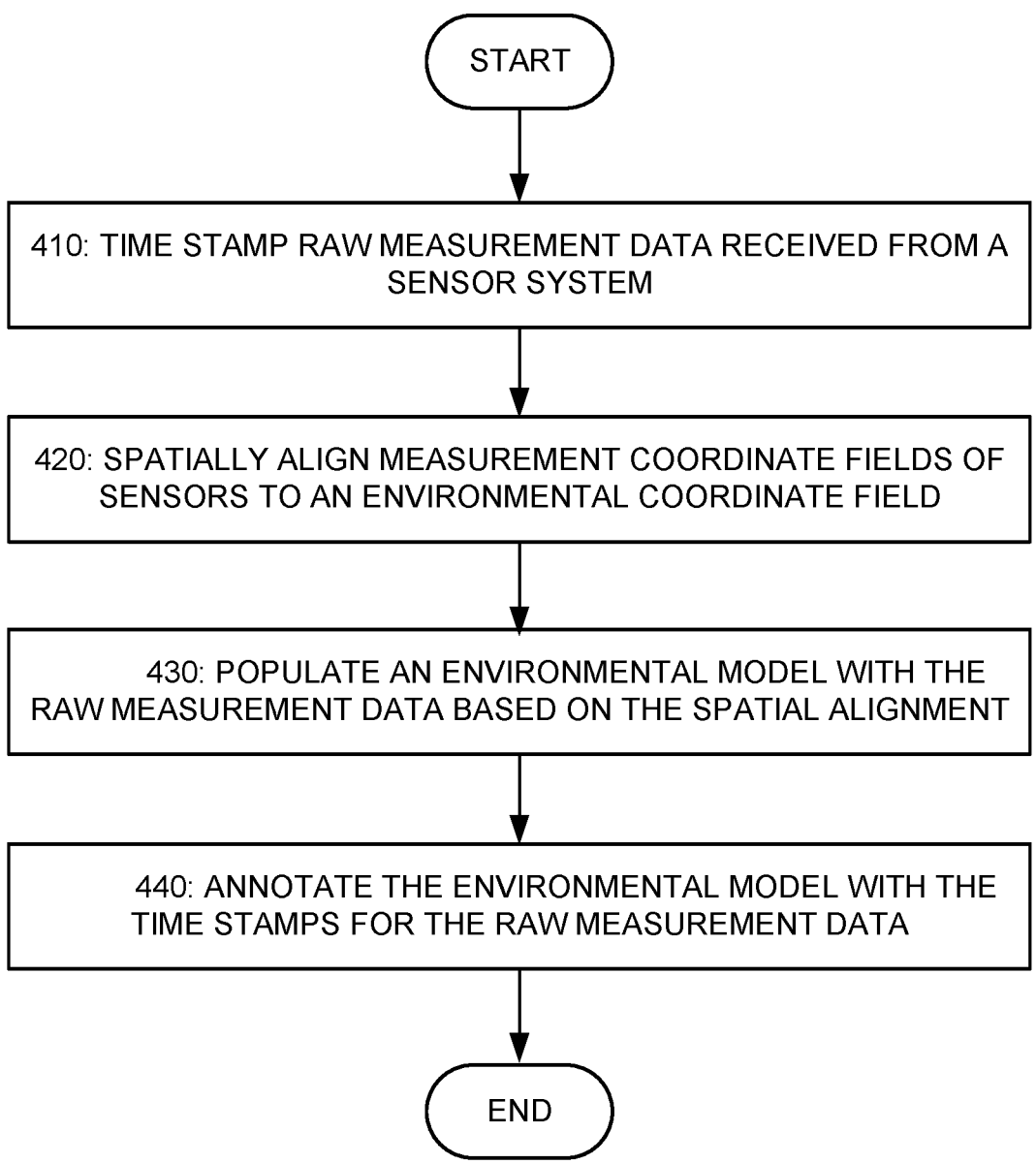
FIG. 4 illustrates an example flowchart for populating and annotating an environmental model according to various examples.

FIG. 4 illustrates an example flowchart for populating and annotating an environmental model according to various examples. Referring to FIG. 4, the steps of the process can be carried out by a computing system, such as sensor fusion unit 300 of FIG. 1. In a block 410, time stamp raw measurement data is received from a sensor system. The computing system can assign time stamps to the raw measurement data based on when each sensor captured the raw measurement data, when the raw measurement data was received by the computing system, or the like. In some embodiments, the computing system may adjust the assigned time stamp by a preset time delay associated with the transmission of the raw measurement data from the sensor system to the computing system. The computing system can assign the timestamps to the raw measurement data by converting a capture time of the raw measurement data provided by the sensor system into a global time of the computing system.

In a block 420, the measurement coordinate fields of sensors are spatially aligned to an environmental coordinate field. The computing system can identify where the measurement coordinate fields of the sensors fall within the environmental coordinate field for the environmental model, for example, based on where the sensors are mounted in the vehicle and the type of sensor associated with each measurement coordinate field.

In a block 430, the environmental model is populated with the raw measurement data based on the spatial alignment. The computing system can utilize the correlation between the measurement coordinate fields of sensors to the environmental coordinate field to convert or translate locations of the raw measurement data into locations within the environmental model. The computing system can populate the environmental model with the raw measurement data based on the correlation between the measurement coordinate fields of the sensors to the environmental coordinate field for the environmental model.

In a block 440, the environmental model is annotated with the time stamps for the raw measurement data. The time stamps for the raw measurement data can be utilized by the computing system to group the raw measurement data in the environmental model into different time periods or time slices. In some embodiments, a size or duration of the time periods or time slices can be based on a refresh rate of one or more sensors in the sensor system. For example, the computing system can set a time slice to correspond to the sensor with a fastest rate of providing new raw measurement data to the computing system. Although FIG. 4 shows blocks 410-440 being performed in a particular order, in some embodiments, the computing system can perform operations in the blocks 410-440 in a different order or the operations in some of the blocks 410-440 may be merged or divided into additional blocks.

Figure 5:
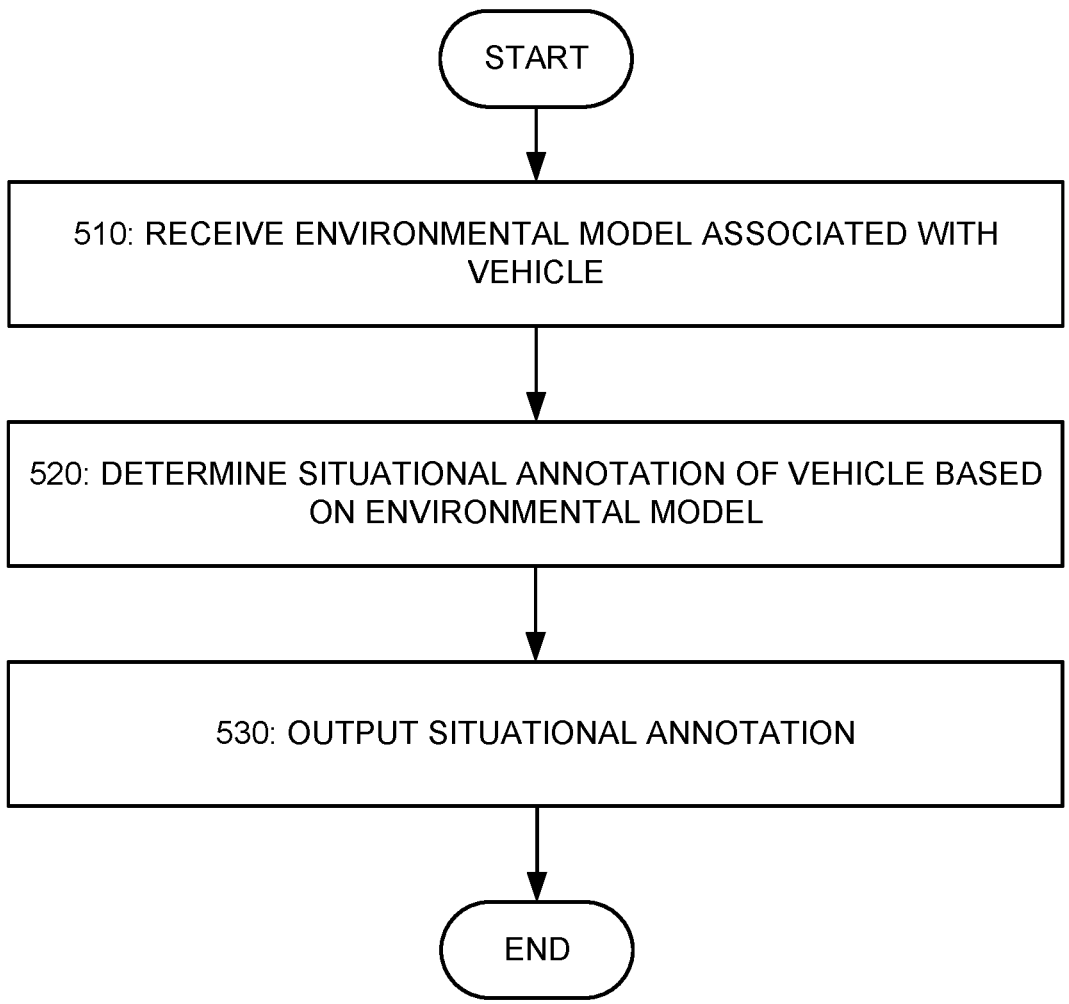
FIG. 5 illustrates an example flowchart for determining a situational annotation of a vehicle according to various examples.

FIG. 5 illustrates an example flowchart for determining a situational annotation of a vehicle according to various examples. Referring to FIG. 5, in a block 510, an annotated environmental model associated with a vehicle is received at, for example, a situational awareness system. The environmental model can be generated and/or updated using the techniques outlined in FIG. 4. The annotated environmental model can include data from a plurality of modalities, such as raw measurement data from one or more sensors, fused sensor data, object level data, data from external sources (e.g., V2X data), high level sensor data, projected object trajectory, results of path planning operation, matched map data, and the like.

In certain cases, an environmental model is updated continuously in real time as the vehicle is in operation. The continuously updated environmental model can provide an annotated description of the surroundings at the current time, all times prior to a current time, and/or a predicted environmental model. For example, a predicted environmental model may include predictions of the trajectory of the vehicle and these predicted trajectories may be included in the annotated environmental model. The annotated environmental model is continuously populated and annotated with raw measurement data from various sensors of the vehicle, information detected by the sensor fusion system, lists of objects and/or class of objects, high level data, data from external sources (e.g., map data, data from other vehicles, etc.), and/or any other relevant data. The environmental model can also take into account various other data including map data matched with the environmental model, dynamic and static obstacles, predictions of object trajectories, path-planner's description of the vehicle's own trajectory, free space, lane location, object classes, regions-of-interest and/or all other annotations added to the environmental model.

In a block 520, a situational annotation of the vehicle is determined based on the environmental model. A situational annotation can include a classification of the entire surroundings of a vehicle, the internal state of the vehicle, and/or other vehicle-related information relative to certain point in time and/or location. In certain cases, a machine learning approach is used to classify the situational annotation of the vehicle. The annotated environmental model or portions thereof can be provided as input to a machine learning module, such as a neural network or other machine learning module. The machine learning module can classify a situation of the vehicle based on the annotated environmental model. The machine learning module can be trained to classify various situations that the vehicle encounters. For example, the machine learning module can be trained using any suitable machine learning training approach (e.g., supervised, unsupervised learning, etc.) on labeled data. The data used to train the machine learning module may include sensor data from multiple modalities, which can include data from multiple sensors, multiple levels of data (e.g., low level data, high level data), data from external sources, and the like. In some embodiments, the situational awareness system can adapt and be updated during the lifecycle of the vehicle to classify new situations. For example, updates may be received from a backbone infrastructure to update or improve the situational awareness system to classify new situations.

For classification, data from an annotated environmental model is provided to the machine learning module, and the machine learning module classifies a situation associated with the vehicle. The classification can be included in or represented by a situational annotation. For example, spatially and/or temporally aligned and/or annotated raw measurement data, sensor fusion data, high level data, and/or other data included in an annotated environmental model is provided as input to a machine learning module. The machine learning module determines a situational annotation by classifying the data from the annotated environmental model.

In some embodiments, a predicted environmental model, localization information, region of interest information, and/or other information are also provided to the classifier. As discussed below, the classifier can determine a situational annotation based on these additional inputs.

In a block 530, a situational annotation is output. The situational annotation may include the result of a situation classification. In certain cases, the situational annotation is output to a system, such as a driving functionality system, a region of interest manager, a path planning decision system, an external server, and/or any other system. In certain cases, a driving functionality system can utilize the situational annotation to control the operation of the vehicle. For example, a forward braking assistant can use situational annotation data to decide whether to apply full braking or implement a swerving maneuver. In some cases, a region of interest management system may use the situational annotation to modify a region of interest monitored by a particular driving functionality system. In other cases, the situational annotation may indicate that a situation is unclassifiable and/or uncertain. For example, data from the annotated environmental model may not be readily classifiable, and it may be determined that the situation is unknown and/or partially unknown. In that case, the situational context can be provided to an external server and/or backbone infrastructure for classification or further analysis as discussed in detail below.

In some embodiments, the annotated environmental model, parts of the annotated environmental model, situational annotation, and/or other data can be stored to a memory associated with the vehicle (such as memory system 330 of FIG. 3). The stored portions of the environmental model and situational annotation can be used to evaluate an incident associated with the vehicle. In one example, a vehicle may be involved in an incident, such as an accident, a near miss, or the like, and a stored portion of the environmental model and situational annotation can be used to analyze the incident. The stored portion of the environmental model and situational annotation can be passed to backbone infrastructure and/or other entity for analysis. The stored data associated with the event can be used to improve the functionality of an automated driving system (e.g., to avoid the incident in future). Updates to a situational awareness system, a driving functionality system, and/or other system can be made based on the data and provided to vehicles in, for example, an over-the-air update. In some cases, the stored portion of the environmental model and situational annotation associated with an incident may also be used by an insurance company, vehicle safety organization, the police, or other entity to analyze the incident.

Figure 6:
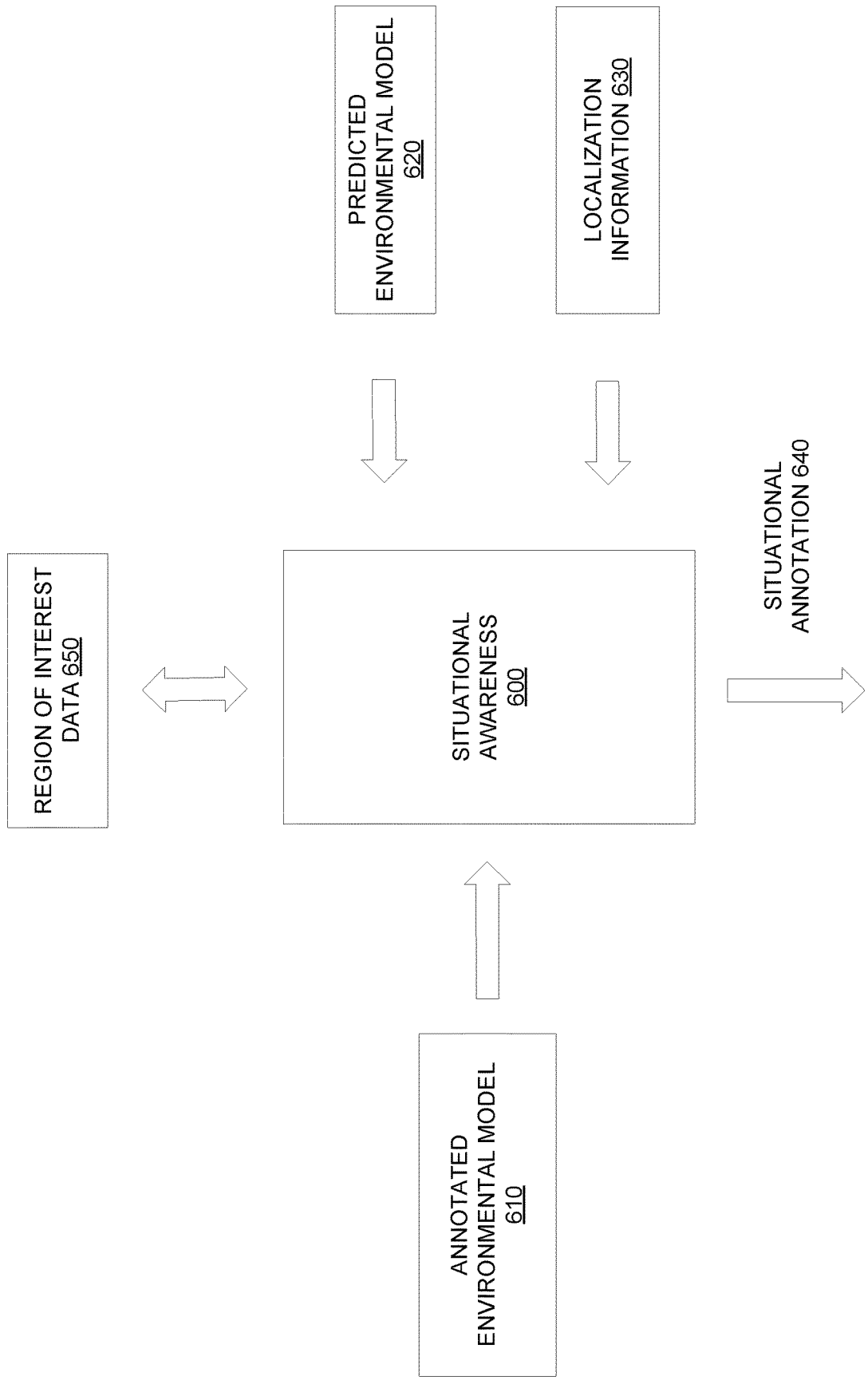
FIG. 6 illustrates an example block diagram for determining a situational annotation of a vehicle according to various examples.

FIG. 6 illustrates an example block diagram for determining a situational annotation of a vehicle according to various examples. The functionality described in FIG. 6 can be carried out in a situational awareness system included, for example, in sensor fusion system 300 of FIG. 3 or alternatively in the driving functionality system 120 of FIG. 1. In the example shown, an annotated environmental model 610, a predicted environmental model 620, localization information 630, region of interest data 650, and/or other situational context data are provided to a situational awareness system 600. The situational awareness system 600 can include a classifier, such as a machine learning classifier, a neural network, or the like. The annotated environmental model 610 can include data from a plurality of modalities, such as raw measurement data from sensors on the vehicle, data generated and/or annotated by a sensor fusion system, data from external sources, and the like. The data in the annotated environmental model 610 can be temporally and/or spatially aligned using the techniques disclosed herein. An annotated environmental model 610 can be provided to the situational awareness system 600. In some cases, only portions of the annotated environmental model 610, for example, including data related to a spatial area over a period of time can be provided to the situational awareness system 600. A classifier included in the situational awareness system 600 can use this data to generate a situational annotation 640.

In some embodiments, a predicted environmental model 620 is provided to the situational awareness system 600. The predicted environmental model 620 can be generated by an object trajectory prediction system, such as object trajectory prediction unit 341 of FIG. 3. The predicted environmental model 620 can include predicted trajectories of various objects, such as tracked objects in the annotated environmental model 610. As discussed herein, the annotated environmental model 610 and a state change prediction model corresponding to a tracked object can be used to predict movement of the tracked object relative to the vehicle in the future. This predicted trajectory can be included in the predicted environmental model 620. The predicted trajectory of objects, such as a moving objects (e.g., vehicles, pedestrians, bicyclists, animals, etc.) and/or stationary objects (e.g., tree, building, etc.) as included in a predicted environmental model 620 can influence the classification of a situation around a vehicle and thus the situational annotation 640. The predicted environmental model 620 can also include a predicted trajectory of the vehicle. For example, the predicted environmental model 620 can include a path planner's description of the vehicle's trajectory. The predicted trajectory of the vehicle may define predicted future locations of the vehicle, which may affect the situation annotation 64.

According to various embodiments, localization information 630 is provided as input to the situational awareness system 600. Localization information 630 can be generated by a localization unit, such as localization unit 342 of FIG. 3. Localization information 630 can include correlations between raw measurement data from various sensors on the vehicle and features (e.g., landmarks, roadways, signs, traffic signals, and like) in map data. The correlations can identify a position of the vehicle relative to features included in map data. For example, localization information 630 can correlate a tracked object, a tracked sensor detection event, or a tracked fused sensor detection event in the annotated environmental model 610 relative to a feature, such as the location of a roadway sign, in map data. The localization information 630 may weigh in to the classification of situation associated with the vehicle, and as a result may weigh into the situational annotation determined by the situational awareness system 600.

In various embodiments, the region of interest data 650 is provided to the situational awareness system 600. Region of interest data 650 may be generated by a region of interest management system, such as region of interest management system 360 of FIG. 3. Region of interest data 650 may define a spatial region (such a portion of a coordinate field) and temporal region (such as a time window) of the annotated environmental model 610. The region of interest data 650 input to the situational awareness system 600 may focus the classifier engine on data associated with the spatial and temporal regions defined by the region of interest data 650. For example, raw sensor data, detection events, tracked objects, fused sensor data, and/or other data included in the region of interest are provided to the situational awareness system 600. Data from outside the region of interest may be filtered out.

A situational annotation 640 is determined using a classifier associated with and/or comprising the situational awareness system 600. The situational annotation 640 can represent the situation in which the vehicle is driving, the state of the vehicle, and/or other aspects relevant to the operation of the vehicle and/or its systems. The situation annotation 640 can be output to any driving functionality system and/or other systems subscribing to the situational awareness system 600.

In some embodiments, the situational annotation 640 is output to a region of interest manager 650. In certain cases, the region of interest manager 650 can update one or more regions of interest based on the situational annotation 640. For example, a region of interest subscribed to by a forward braking assist system may be enlarged based on situational annotation 640 indicating that the vehicle is traveling into an intersection including multiple tracked objects, such as pedestrians, bicyclists, and the like, and a detection event indicating as of yet unclassified object is moving across the path in front of the vehicle. Adjustment of the region of interest is discussed in detail below.

Figure 7:
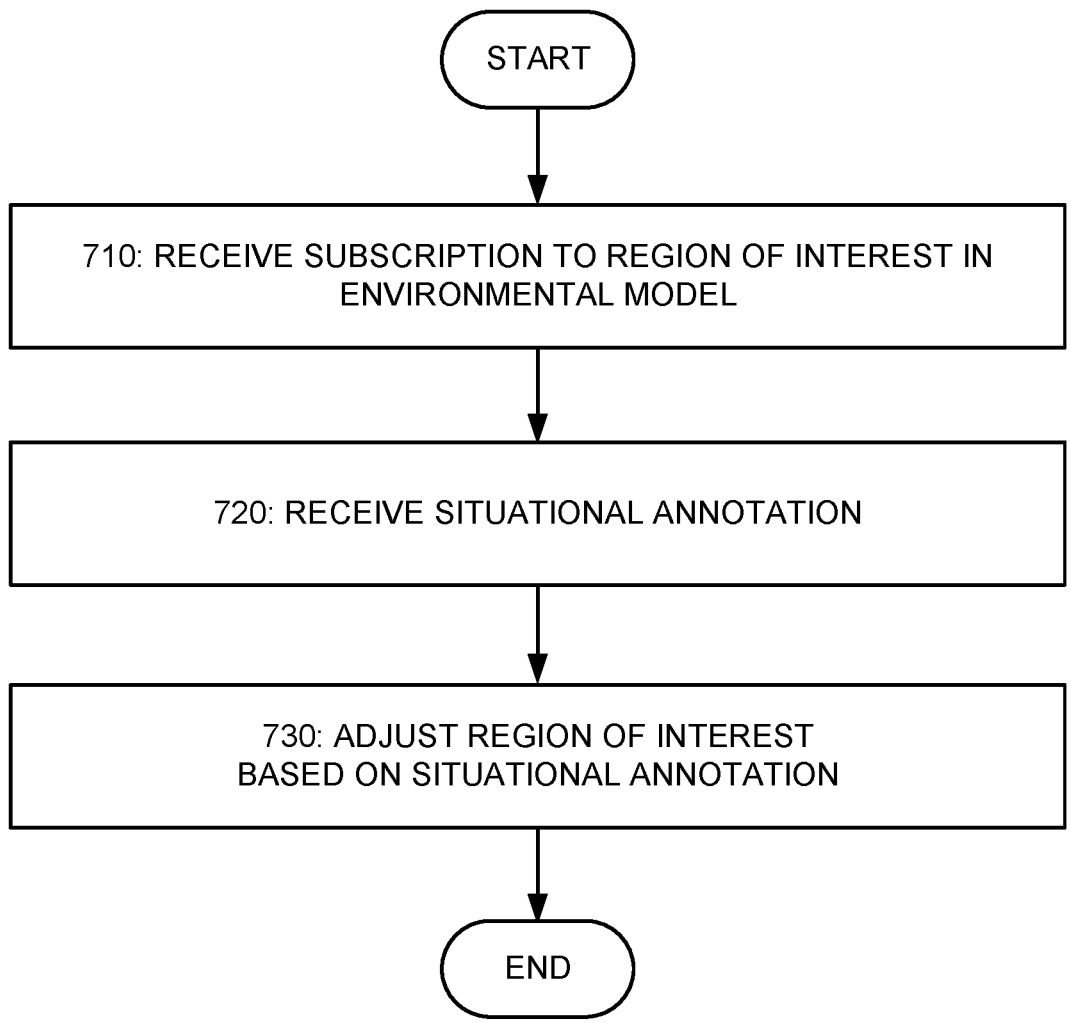
FIG. 7 illustrates an example flowchart for adjusting a region of interest according to various examples.

FIG. 7 illustrates an example flowchart for adjusting a region of interest according to various examples. Referring to FIG. 7, in a block 710, a subscription to a region of interest in an environmental model is received. The subscription can be received at, for example, a region of interest management system from an event management system (e.g., a publish-subscribe system). The subscription information can identify at least one region of interest in an environmental model. The region of interest can have a spatial description, for example, a portion of the environmental coordinate field in the environmental model. The region of interest can also have a temporal description, for example, as a time window or a time offset during which the region of interest management system can monitor the environmental model.

In a block 720, a situational annotation is received. The situational annotation can be received at the region of interest management system from a situational awareness system, such as situational awareness system 370 of FIG. 3. In some cases, the situational awareness system may provide the region of interest management system an updated situational annotation periodically, when there is a change in a situational annotation that would be relevant to a region of interest, and/or at other times.

In a block 730, a region of interest is adjusted based on the situational annotation. In one example, a region of interest corresponds to a forward braking assistant. The region of interest manager may receive a situational annotation indicating that the vehicle is approaching an intersection. Prior to the intersection the region of interest in the environmental model may include the region in front of the vehicle. As the vehicle approaches the intersection the region of interest may be expanded to include side sensor fields to detect events on the side of the vehicle, such as potential vulnerable road users, pedestrian crossings, bike lanes, and the like, and to include cross-traffic sensors to detect events to the sides of the vehicle, such as vehicles, pedestrians, and the like crossing in front of the vehicle. In a further example, when the vehicle approaching the traffic intersection has a path planned turn, the region of interest may dynamically adapt to include portions of the roadway after the turn. The situational annotation may take into account locational information regarding another vehicle in an adjacent lane of traffic, which may prompt the region of interest to be expanded to monitor the other vehicle for possible lane change.

Figure 8:
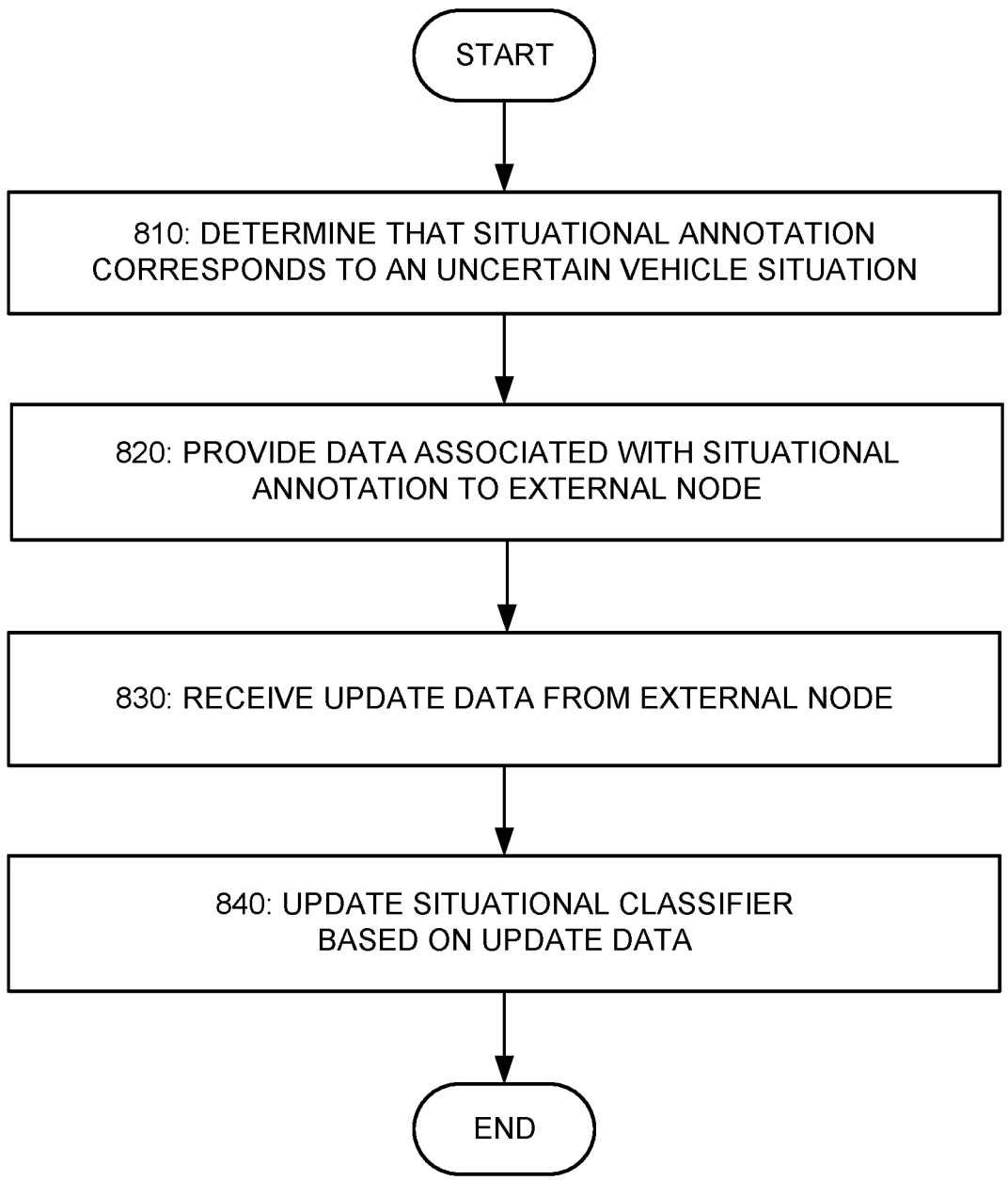
FIG. 8 illustrates an example flowchart for updating a situational awareness classifier according to various examples.

FIG. 8 illustrates an example flowchart for updating a situational awareness classifier according to various examples. Referring to FIG. 8, in a block 810, a situational awareness system determines that a situation cannot be classified with high enough confidence. A situational awareness system may determine that aspects of the environment around the vehicle, the internal state of the vehicle, and/or other situation-related data are unknown. In some cases, portions of an annotated environment model may include data that is not classifiable by a situational awareness system.

According to various embodiments, the situational awareness system can determine that a situation is uncertain when a classification confidence is beneath a certain threshold.

In a block 820, the situational awareness system provides data associated with the uncertain situation to an external node. Data describing the uncertain or new situation, such as environmental model data, predicted environmental model data, localization information, region of interest information, situational annotation, and/or any other information related to the uncertain situation is provided to an external node. Depending on a level of uncertainty in a specific situation, an appropriate amount of situational context can be uploaded to the external node. The external node can include an external server, backbone system, and/or other node in an infrastructure associated with the situational awareness system and/or AD/ADAS systems.

In some embodiments, the external node includes additional computing resources to evaluate and classify the uncertain and/or new situation. In certain cases, a backbone system can utilize machine learning approaches with more computing power and more training data in order to take the new situation into account. The backbone system can generate update data to re-parameterize the machine learning system in the vehicle. This update information can be provided to the situational awareness system and/or situational awareness systems associated with multiple vehicles in a fleet.

In a block 830, update information is received at the situational awareness system. The update data can be received, for example, during an over-the-air software update. In a block 840, the situational classifier system is updated. The update information can include parameters, such as classifier parameters, and/or other information. The update information can be used to improve the situational awareness classifier (e.g., machine learning system) to properly classify the new situation and generate situational annotation data as prescribed by the backbone system.

Illustrative Operating Environment

The execution of object recognition and classification techniques according to embodiments may be implemented using computer-executable software instructions executed by one or more programmable computing devices. Because these embodiments may be implemented using software instructions, the components and operation of a programmable computer system on which various embodiments may be employed will be described below.

Figure 9:
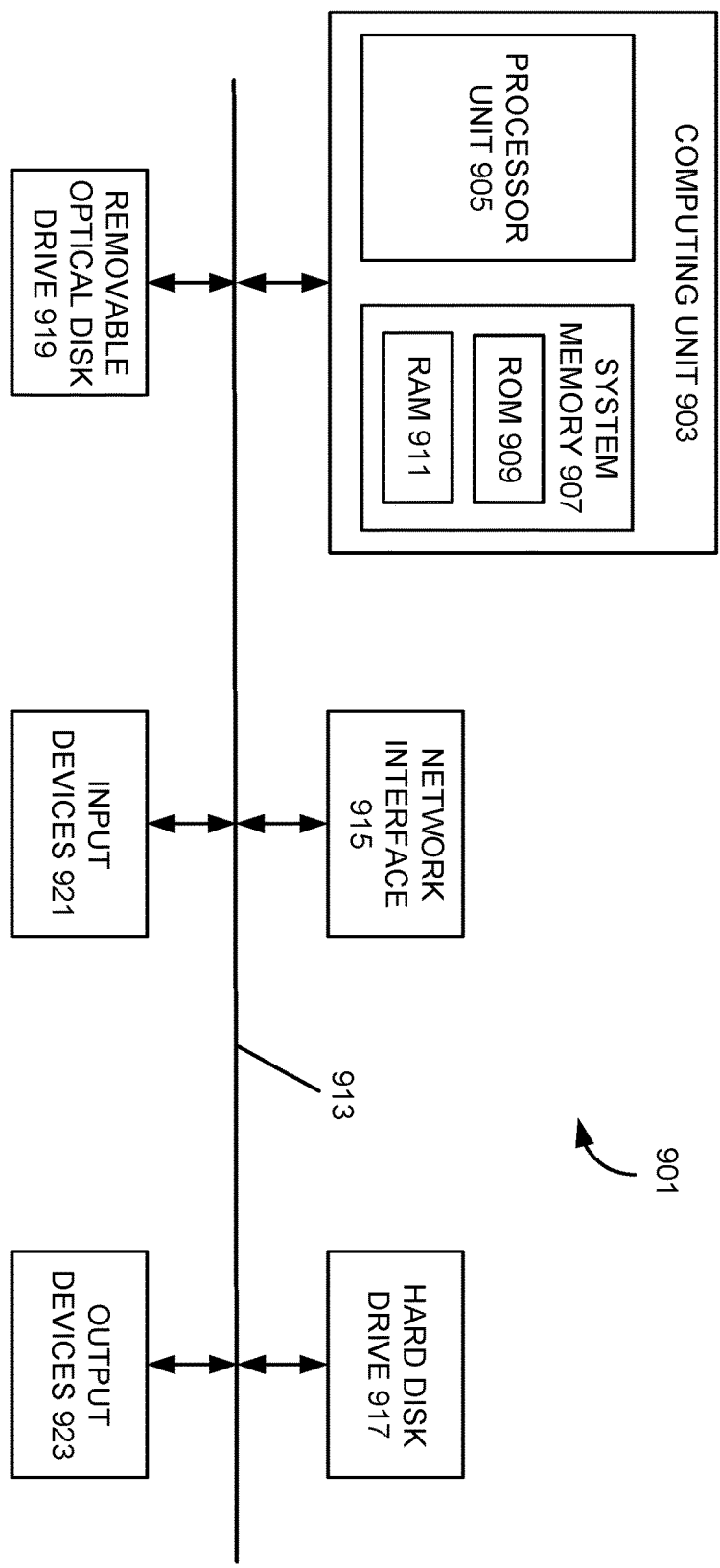
FIGS. 9 and 10 illustrate an example of a computer system of the type that may be used to implement various embodiments.
Figure 10:
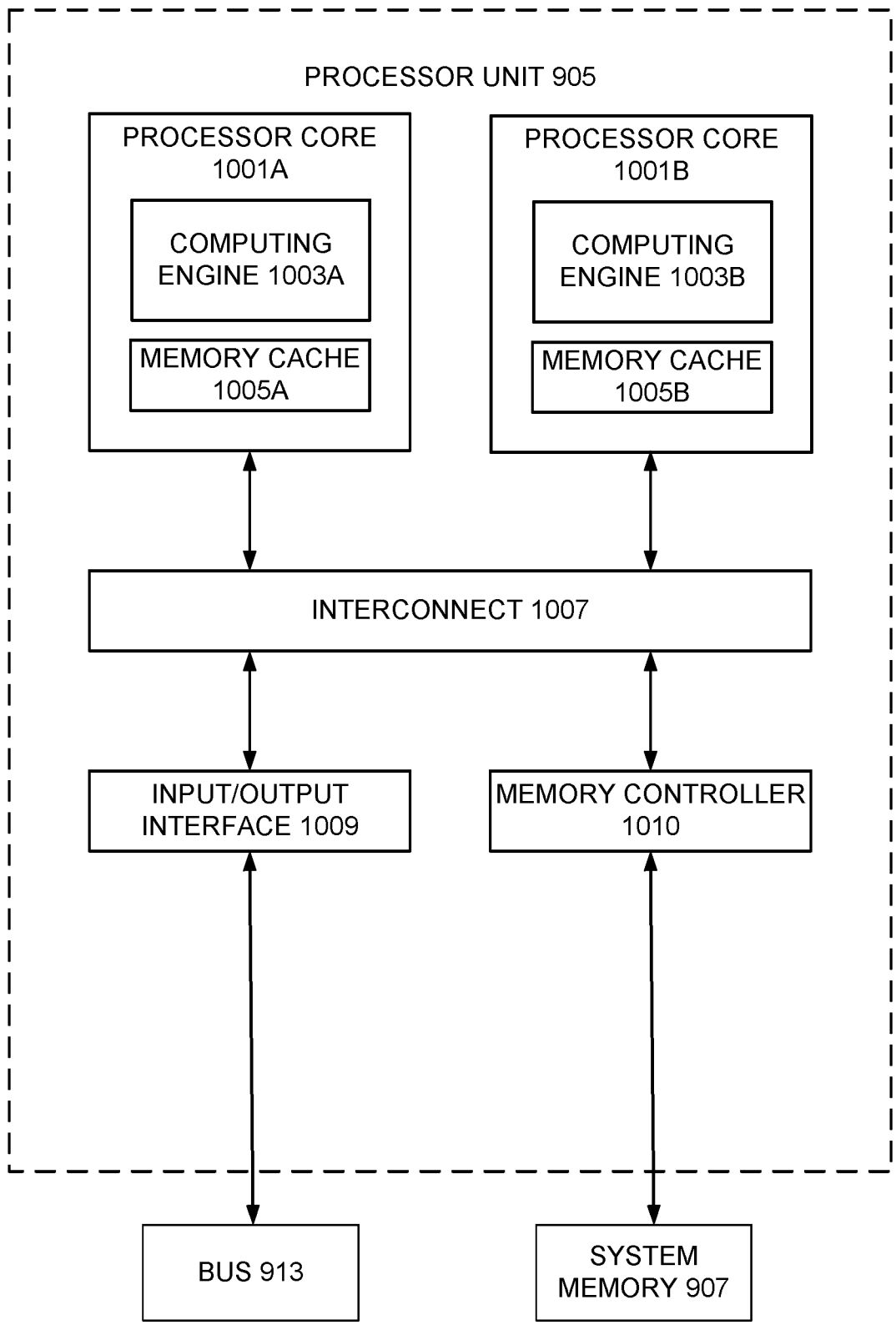

FIGS. 9 and 10 illustrate an example of a computer system of the type that may be used to implement various embodiments. Referring to FIG. 9, various examples may be implemented through the execution of software instructions by a computing device 901, such as a programmable computer. Accordingly, FIG. 9 shows an illustrative example of a computing device 901. As seen in FIG. 9, the computing device 901 includes a computing unit 903 with a processing unit 905 and a system memory 907. The processing unit 905 may be any type of programmable electronic device for executing software instructions, but will conventionally be a microprocessor. The system memory 907 may include both a read-only memory (ROM) 909 and a random access memory (RAM) 911. As will be appreciated by those of ordinary skill in the art, both the read-only memory (ROM) 909 and the random access memory (RAM) 911 may store software instructions for execution by the processing unit 905.

The processing unit 905 and the system memory 907 are connected, either directly or indirectly, through a bus 913 or alternate communication structure, to one or more peripheral devices 917-923. For example, the processing unit 905 or the system memory 907 may be directly or indirectly connected to one or more additional memory storage devices, such as a hard disk drive 917, which can be magnetic and/or removable, a removable optical disk drive 919, and/or a flash memory card. The processing unit 905 and the system memory 907 also may be directly or indirectly connected to one or more input devices 921 and one or more output devices 923. The input devices 921 may include, for example, a keyboard, a pointing device (such as a mouse, touchpad, stylus, trackball, or joystick), a scanner, a camera, and a microphone. The output devices 923 may include, for example, a monitor display, a printer and speakers. With various examples of the computing device 901, one or more of the peripheral devices 917-923 may be internally housed with the computing unit 903. Alternately, one or more of the peripheral devices 917-923 may be external to the housing for the computing unit 903 and connected to the bus 913 through, for example, a Universal Serial Bus (USB) connection.

With some implementations, the computing unit 903 may be directly or indirectly connected to a network interface 915 for communicating with other devices making up a network. The network interface 915 can translate data and control signals from the computing unit 903 into network messages according to one or more communication protocols, such as the transmission control protocol (TCP) and the Internet protocol (IP). Also, the network interface 915 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 901 is illustrated as an example only, and it not intended to be limiting. Various embodiments may be implemented using one or more computing devices that include the components of the computing device 901 illustrated in FIG. 9, which include only a subset of the components illustrated in FIG. 9, or which include an alternate combination of components, including components that are not shown in FIG. 9. For example, various embodiments may be implemented using a multi-processor computer, a plurality of single and/or multiprocessor computers arranged into a network, or some combination of both.

With some implementations, the processor unit 905 can have more than one processor core. Accordingly, FIG. 10 illustrates an example of a multi-core processor unit 905 that may be employed with various embodiments. As seen in this figure, the processor unit 905 includes a plurality of processor cores 1001A and 1001B. Each processor core 1001A and 1001B includes a computing engine 1003A and 1003B, respectively, and a memory cache 1005A and 1005B, respectively. As known to those of ordinary skill in the art, a computing engine 1003A and 1003B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 1003A and 1003B may then use its corresponding memory cache 1005A and 1005B, respectively, to quickly store and retrieve data and/or instructions for execution.

Each processor core 1001A and 1001B is connected to an interconnect 1007. The particular construction of the interconnect 1007 may vary depending upon the architecture of the processor unit 905. With some processor cores 1001A and 1001B, such as the Cell microprocessor created by Sony Corporation, Toshiba Corporation and IBM Corporation, the interconnect 1007 may be implemented as an interconnect bus. With other processor units 1001A and 1001B, however, such as the Opteron™ and Athlon™ dual-core processors available from Advanced Micro Devices of Sunnyvale, Calif., the interconnect 1007 may be implemented as a system request interface device. In any case, the processor cores 1001A and 1001B communicate through the interconnect 1007 with an input/output interface 1009 and a memory controller 1010. The input/output interface 1009 provides a communication interface between the processor unit 905 and the bus 913. Similarly, the memory controller 1010 controls the exchange of information between the processor unit 905 and the system memory 907. With some implementations, the processor unit 905 may include additional components, such as a high-level cache memory accessible shared by the processor cores 1001A and 1001B. It also should be appreciated that the description of the computer network illustrated in FIG. 9 and FIG. 10 is provided as an example only, and it not intended to suggest any limitation as to the scope of use or functionality of alternate embodiments.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in a computer-readable memory device. The memory device may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory device may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory devices may be "read only" by design (ROM) by virtue of permission settings, or not. Other examples of memory devices may include, but may not be limited to, WORM, EPROM, EEPROM, FLASH, NVRAM, OTP, or the like, which may be implemented in solid state semiconductor devices. Other memory devices may comprise moving parts, such as a known rotating disk drive. All such memory devices may be "machine-readable" and may be readable by a processing device.

Operating instructions or commands may be implemented or embodied in tangible forms of stored computer software (also known as "computer program" or "code"). Programs, or code, may be stored in a digital memory device and may be read by the processing device. "Computer-readable storage medium" (or alternatively, "machine-readable storage medium") may include all of the foregoing types of computer-readable memory devices, as well as new technologies of the future, as long as the memory devices may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out various embodiments, those skilled in the art will appreciate that there are numerous variations and permutations of the above described systems and techniques that fall within the spirit and scope of the invention as set forth in the appended claims. For example, while specific terminology has been employed above to refer to systems and electronic design automation processes, it should be appreciated that various examples may be implemented using any desired combination of systems and electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

What is claimed is:
1. A method comprising:
receiving, at a processor of a sensor fusion system of a vehicle, an environmental model comprising raw measurement data from a plurality of sensors of the vehicle, the plurality of sensors having distinct modalities, wherein the raw measurement data is temporally aligned in the environmental model and spatially aligned in the environmental model based on where the sensors are mounted in the vehicle;
receiving, at the processor, object annotations indicating a detection of at least one object based on the raw measurement data in the environmental model, the object annotations comprising a confidence level associated with the detection of the at least one object;
modifying, via the processor, the environmental model to include the object annotations, resulting in an annotated environmental model, wherein the object annotations are temporally aligned and spatially aligned in the annotated environmental model;
generating, via the processor, a classification result of a current situation of the vehicle based, at least in part, on the raw measurement data and the object annotations in the annotated environmental model; and
transmitting, via the processor, the classification result to a processor associated with driving functionality of the vehicle, wherein the processor associated with driving functionality is configured to control operation the vehicle based, at least in part, on the classification result.

2. The method of claim 1, further comprising:
generating, via the processor and based on the classification result, a feedback signal; and
transmitting, from the processor to at least one sensor in the plurality of sensors, the feedback signal which causes at least one of repositioning the at least one sensor, or expanding a field of view of the at least one sensor, or changing a rate of exposure of the at least one sensor.

3. The method of claim 1, wherein the classification result is further determined based on one or more of a region of interest in the environmental model, a predicted environmental model, and localization information.

4. The method of claim 1, wherein the distinct modalities comprise one or more of raw measurement data from one or more sensors on the vehicle, fused sensor data, high level data, and data from one or more external sources.

5. The method of claim 1, further comprising providing the classification result to a processor configured to adjust a region of interest in the environmental model based, at least in part, on the classification result.

6. The method of claim 1, further comprising:
determining that the classification result identifies an uncertain vehicle situation; and
providing classification data associated with the classification result to an external computing system located away from the vehicle, wherein the external computing system is configured to use the classification data to generate an update to the sensor fusion system based on the uncertain vehicle situation.

7. The method of claim 6, further comprising:
receiving, from the external computing system, the update; and
modifying the processor based on the update from the external computing system.

8. The method of claim 1, further comprising:
storing the annotated environmental model and classification result to a memory associated with the vehicle; and
upon detecting an incident associated with the vehicle, evaluating the incident using the annotated environmental model and classification result stored in the memory.

9. An apparatus comprising at least one memory device storing instructions configured to cause one or more processing devices of a sensor fusion system to perform operations comprising:
receiving an environmental model comprising raw measurement data from a plurality of sensors of the vehicle, the plurality of sensors having distinct modalities, wherein the raw measurement data is temporally aligned in the environmental model and spatially aligned in the environmental model based on where the sensors are mounted in the vehicle;
receiving object annotations indicating a detection of at least one object based on the raw measurement data in the environmental model, the object annotations comprising a confidence level associated with the detection of the at least one object;
modifying the environmental model to include the object annotations, resulting in an annotated environmental model, wherein the object annotations are temporally aligned and spatially aligned in the annotated environmental model;
generating a classification result of a current situation of the vehicle based, at least in part, on the raw measurement data and the object annotations in the annotated environmental model; and
transmitting the classification result to a processor associated with driving functionality of the vehicle, wherein the processor associated with driving functionality is configured to control operation the vehicle based, at least in part, on the classification result.

10. The apparatus of claim 9, wherein the instructions are further configured to cause the one or more processing devices to perform operations comprising:
generating, based on the classification result, a feedback signal; and
transmitting, to the at least one sensor in the plurality of sensors, the feedback signal, causing at least one of repositioning the at least one sensor, or expanding a field of view of the at least one sensor, or changing a rate of exposure of the at least one sensor.

11. The apparatus of claim 9, wherein the classification result is further determined based on one or more of a region of interest in the environmental model, a predicted environmental model, and localization information.

12. The apparatus of claim 9, wherein the instructions are further configured to cause the one or more processing devices to perform operations comprising providing the classification result to a processor configured to adjust a region of interest in the environmental model based, at least in part, on the classification result.

13. The apparatus of claim 9, wherein the instructions are further configured to cause the one or more processing devices to perform operations comprising:
determining that the classification result identifies an uncertain vehicle situation; and
providing classification data associated with the classification result to an external computing system located away from the vehicle, wherein the external computing system is configured to use the classification data to generate an update to the sensor fusion system based on the uncertain vehicle situation.

14. The apparatus of claim 13, wherein the instructions are further configured to cause the one or more processing devices to perform operations comprising:
receiving, from the external computing system, the update; and
modifying the one or more processing devices based on the update from the external computing system.

15. A sensor fusion system comprising:
a memory device configured to store machine-readable instructions; and
one or more processing devices winch, in response to executing the machine-readable, instructions, perform operations comprising:
receiving an environmental model comprising raw measurement data from a plurality of sensors of the vehicle, the plurality of sensors having distinct modalities, wherein the raw measurement data is temporally aligned in the environmental model and spatially aligned in the environmental model based on where the sensors are mounted in the vehicle;
receiving object annotations indicating a detection of at least one object based on the raw measurement data in the environmental model, the object annotations comprising a confidence level associated with the detection of the at least one object;
modifying the environment model to include the object annotations, resulting in an annotated environmental model, wherein the object annotations are temporally aligned and spatially aligned in the annotated environmental model;

generating a classification result of a current situation of the vehicle based, at least in part, on the raw measurement data and the object annotations in the annotated environmental model; and transmitting the classification result to a processor associated with driving functionality of the vehicle, wherein the processor associated with driving functionality is configured to control operation the vehicle based, at least in part, on the classification result.

16. The sensor fusion system of claim 15, wherein the one or more processing devices, in response to executing the machine-readable instructions, are configured to:

generate, based on the classification result, a feedback signal; and transmit, to the at least one sensor in the plurality of sensors, the feedback signal, causing at least one of repositioning the at least one sensor, or expanding a field of view of at least one sensor, or changing a rate of exposure of the at least one sensor.

17. The sensor fusion system of claim 15, wherein the one or more processing devices, in response to executing the machine-readable instructions, are configured to provide the classification result to a processor configured to adjust a region of interest in the environmental model based, at least in part, on the classification result.

18. The sensor fusion system of claim 15, wherein the one or more processing devices, in response to executing the machine-readable instructions, are configured to:

determine that the classification result identifies an uncertain vehicle situation; and provide classification data associated with the classification result to an external computing system located away from the vehicle, wherein the external computing system is configured to use the classification data to generate an update to the sensor fusion system based on the uncertain vehicle situation.

19. The sensor fusion system of claim 18, wherein the one or more processing devices, in response to executing the machine-readable instructions, are configured to:

receive, from the external computing system, the update; and modify the one or more processing devices based on the update from the external computing system.

\* \* \* \* \*